(12) United States Patent
Midya

(10) Patent No.: US 11,157,099 B2
(45) Date of Patent: Oct. 26, 2021

(54) ELECTRONIC WRITING DEVICE AND A METHOD FOR OPERATING THE SAME

(71) Applicant: ADX Research, Inc., Schaumburg, IL (US)

(72) Inventor: Pallab Midya, Palatine, IL (US)

(73) Assignee: ADX Research, Inc., Schaumburg, IL (US)

( * ) Notice: Subject to any disclaimer, the term of this patent is extended or adjusted under 35 U.S.C. 154(b) by 0 days.

(21) Appl. No.: 16/531,160

(22) Filed: Aug. 5, 2019

(65) Prior Publication Data

US 2021/0041958 A1    Feb. 11, 2021

(51) Int. Cl.
| | |
|---|---|
| G06F 3/033 | (2013.01) |
| G06F 3/038 | (2013.01) |
| G06F 3/0354 | (2013.01) |
| G06F 3/0346 | (2013.01) |
| G06K 9/00 | (2006.01) |
| G06K 9/22 | (2006.01) |
| G06K 9/03 | (2006.01) |
| G06F 21/31 | (2013.01) |
| G06K 9/24 | (2006.01) |
| G06F 40/174 | (2020.01) |

(52) U.S. Cl.
CPC ............ *G06F 3/038* (2013.01); *G06F 3/0346* (2013.01); *G06F 3/03545* (2013.01); *G06F 21/31* (2013.01); *G06K 9/00422* (2013.01); *G06K 9/03* (2013.01); *G06K 9/222* (2013.01); *G06K 9/24* (2013.01); *G06F 40/174* (2020.01); *G06F 2203/0383* (2013.01); *G06F 2203/0384* (2013.01)

(58) Field of Classification Search
CPC ........ G06F 3/038; G06F 21/31; G06F 3/0346; G06F 3/03545; G06F 21/32; G06F 2203/0383; G06F 2203/0384; G06F 40/174; G06K 9/03; G06K 9/00422; G06K 9/222; G06K 9/24
See application file for complete search history.

(56) References Cited

U.S. PATENT DOCUMENTS

| | | | | |
|---|---|---|---|---|
| 5,177,472 A | * | 1/1993 | Taniishi | ............... G06F 3/03545 178/19.02 |
| 5,347,589 A | * | 9/1994 | Meeks | ............... G06K 9/00154 178/18.01 |
| 5,517,579 A | * | 5/1996 | Baron | ................ G06K 9/00422 382/187 |

(Continued)

*Primary Examiner* — Insa Sadio
(74) *Attorney, Agent, or Firm* — Jason C. Cameron

(57) ABSTRACT

An electronic writing device is provided. The electronic writing device includes a tip configured to enable writing on a physical surface. The electronic writing device also includes an electronic chip housed in a body of the electronic writing device and coupled to the tip. The electronic chip includes an accelerometer configured to record an acceleration data of the electronic writing device when writing on the physical surface. The electronic chip also includes a gyrometer configured to generate a rotation data corresponding to rotation of the electronic writing device. The electronic writing device further includes a communication module operatively coupled to the electronic chip. The communication module is configured to send data received from the electronic chip to an external processing medium.

47 Claims, 19 Drawing Sheets

(56) References Cited

U.S. PATENT DOCUMENTS

| | | | | |
|---|---|---|---|---|
| 5,539,160 | A * | 7/1996 | Tokioka | G06F 3/03545 178/18.02 |
| 6,081,261 | A * | 6/2000 | Wolff | G06F 3/03545 178/18.01 |
| 6,486,874 | B1 * | 11/2002 | Muthuswamy | G06F 3/04883 178/18.01 |
| 7,929,767 | B2 * | 4/2011 | Xu | G06K 9/72 382/186 |
| 2002/0063700 | A1 * | 5/2002 | Kobayashi | B29C 45/0025 345/179 |
| 2002/0130850 | A1 * | 9/2002 | Kobayashi | G06K 9/224 345/180 |
| 2003/0048948 | A1 * | 3/2003 | Confer | G06K 9/222 382/197 |
| 2004/0085286 | A1 * | 5/2004 | Wang | G06F 3/03545 345/156 |
| 2004/0136083 | A1 * | 7/2004 | Wang | G06F 3/0317 359/642 |
| 2006/0062471 | A1 * | 3/2006 | Xu | G06K 9/00422 382/186 |
| 2007/0005849 | A1 * | 1/2007 | Oliver | G06F 3/03545 710/72 |
| 2009/0183929 | A1 * | 7/2009 | Zhang | G06F 3/03545 178/18.01 |
| 2012/0020566 | A1 * | 1/2012 | Yamanouchi | G06F 3/033 382/187 |
| 2014/0176495 | A1 * | 6/2014 | Vlasov | G06F 3/0441 345/174 |
| 2014/0245120 | A1 * | 8/2014 | Schwartz | G06K 9/00402 715/226 |
| 2015/0301651 | A1 * | 10/2015 | Leigh | G06F 3/0446 345/174 |
| 2015/0301661 | A1 * | 10/2015 | Leigh | G06F 3/0433 345/174 |
| 2015/0302554 | A1 * | 10/2015 | Costa | G06T 9/00 345/174 |
| 2016/0188085 | A1 * | 6/2016 | Leigh | G06F 3/044 345/174 |
| 2017/0024064 | A1 * | 1/2017 | Wigdor | G06F 3/04166 |
| 2017/0308183 | A1 * | 10/2017 | Loeschinger | G06F 3/0346 |
| 2019/0064936 | A1 * | 2/2019 | Wang | G06F 3/016 |

* cited by examiner

ELECTRONIC WRITING DEVICE AND A METHOD FOR OPERATING THE SAME

BACKGROUND

Embodiments of a present disclosure relate to an electronic input device and more particularly to, an electronic writing device and a method for operating the same.

An electronic input writing device is an electronic input device that digitally captures writing gestures of a user and converts the captured gestures to digital information that can be utilized in a variety of applications. There are several electronic writing devices for entering data into a computing device such as keyboard, styluses and pen.

One such device uses touchscreen electronic devices, such as cellular phones, tablet devices and personal digital assistants and allow a user to enter data using a resistive-tip stylus. However, stylus currently used for entering data with a touch-screen computing device typically require that the tip of the stylus actually come in contact with the touch-screen or another type of specialized surface. The problem with these different types of styluses is that they all require that the user write on a specialized surface, whether the specialized surface be the actual screen of the computing device or a specialized paper.

Furthermore, pen-based digital devices have been introduced, for capturing the gestures and converting the same to digital information, which are useful, portable and greatly desired. The user of such devices may often desire to share the pen-based digital device with others. However, such situation causes at least two problems with handwriting recognition. First, the pen-based digital devices have difficulty in recognizing the guest user's handwriting because the pen based digital devices have adapted the recognition ability with respect to the primary user's handwriting. Second, during use by the guest user, the pen-based writing device adapts and updates corresponding handwriting recognition database to the guest's handwriting. After prolonged use by the guest, the recognition capability of the pen-based digital devices decreases with respect to the primary user's handwriting. Handwriting recognition can thus be degraded when different users operate the same pen-based writing device.

With advancement in technology, some pen based digital devices have been introduced which captures a handwriting or a plurality of strokes of the user and converts a handwritten information into digital data. Further, the pen based digital device senses movement direction and distance travelled by the input apparatus by use of an acceleration sensor and then compensates for an influence exerted on the movement direction and the distance sensed by the acceleration sensor by the action of the pen-shaped digital devices' rotation by use of a piezoelectric vibration gyroscope. However, device compensates only for effects due to the rotation of the input apparatus and cannot compensate for effects caused by dynamic inclination. At the time of performing an ordinary handwriting operation, the apparatus may be accompanied with a dynamic inclination and therefore the result of detection is inaccurate on some occasions.

Existing devices utilize accelerometer, gyrometer and positional sensors to determine the position of the writing device on the physical surface. The accelerometer and gyrometer are being used to provide a frame of reference to the position information which is collected by the accelerometer. However, use of positional sensor along with the accelerometer and the gyrometer results in increase in cost of the writing device. Further, few writing devices exist which calculate the position of the writing device using the acceleration received from the accelerometer. By double integrating the acceleration and using the high frequency noise from the accelerometer, the position of the writing device on the physical surface may be determined. However, in such devices, constants of integration results in large DC errors.

Hence, there is a need for an improved electronic writing device to address the aforementioned issue(s).

BRIEF DESCRIPTION

In accordance with an embodiment of the present disclosure, an electronic writing device is provided. The electronic writing device includes a tip configured to enable writing on a physical surface. The electronic writing device also includes an electronic chip housed in a body of the electronic writing device and coupled to the tip. The electronic chip includes an accelerometer configured to record an acceleration data of the electronic writing device when writing on the physical surface. The electronic chip also includes a gyrometer configured to generate a rotation data corresponding to rotation of the electronic writing device. The electronic writing device further includes a communication module operatively coupled to the electronic chip. The communication module is configured to send data received from the electronic chip to an external processing medium.

In accordance with another embodiment of the present disclosure, an electronic writing device is provided. The electronic writing device includes a tip configured to enable writing on a physical surface. The electronic writing device also includes an electronic chip housed in a body of the electronic writing device and coupled to the tip. The electronic chip includes an accelerometer configured to record an acceleration data of the electronic writing device when writing on the physical surface. The electronic chip also includes a gyrometer configured to generate a rotation data corresponding to rotation of the electronic writing device. The electronic writing device further includes a memory device operatively coupled to the electronic chip. The memory device is configured to store data received from the electronic chip. The electronic writing device is configured to a communication module operatively coupled to the memory device. The communication module is configured to send the data stored in the memory to an external processing medium.

In accordance with yet another embodiment of the present disclosure, an electronic writing device is provided. The electronic writing device includes a tip configured to enable writing on a physical surface. The electronic writing device also includes an electronic chip housed in a body of the electronic writing device and coupled to the tip. The electronic chip includes an accelerometer configured to record an acceleration data of the electronic writing device when writing on the physical surface. The electronic chip also includes a gyrometer configured to generate a rotation data corresponding to rotation of the electronic writing device. The electronic writing device further includes a memory device operatively coupled to the electronic chip. The memory device is configured to store data received from the electronic chip. The electronic writing device further includes a processor operatively coupled to the memory device. The processor is configured to retrieve a stored data from the memory device. The processor is also configured to generate a writing data corresponding to the acceleration data and the rotation data. The processor further configured to detect a contact of the electronic writing device with the physical surface based on a predefined frequency noise data detected from the acceleration data. The processor is further configured to calculate a position of the electronic writing device during contact of the electronic writing device with the physical surface based on the acceleration data obtained from the accelerometer and the rotation data obtained from the gyrometer.

In accordance with yet another embodiment of the present disclosure, an electronic chip is provided. The electronic chip includes an accelerometer configured to record an acceleration data of an electronic writing device when writing on a physical surface. The electronic chip also includes a gyrometer configured to generate a rotation data corresponding to rotation of the electronic writing device. The electronic chip further includes a memory device operatively coupled to the accelerometer and the gyrometer. The memory device is configured to store data received from the accelerometer and the gyrometer. The electronic chip further includes a processor operatively coupled to the memory device. The processor is configured to generate a writing data corresponding to the acceleration data and the rotation data. The processor is also configured to detect a contact of the electronic writing device with the physical surface based on a predefined frequency noise data detected from the acceleration data. The processor is further configured to calculate a position of the electronic writing device during contact of the electronic writing device with the physical surface based on the acceleration data obtained from the accelerometer and the rotation data obtained from the gyrometer.

In accordance with yet another embodiment of the present disclosure, a method for operating an electronic writing device is provided. The method includes enabling writing on a physical surface using an electronic writing device. The method also includes receiving an acceleration data from an accelerometer when writing on the physical surface using the electronic writing device. The method further includes receiving a rotation data corresponding to rotation of the electronic writing device. The method further includes generating a writing data corresponding to the acceleration data and the rotation data. The method further includes detecting a contact of the electronic writing device with the physical surface based on a predefined frequency noise data detected from the acceleration data. The method further includes calculating a position of the electronic writing device during contact of the electronic writing device with the physical surface based on the acceleration data obtained from the accelerometer and the rotation data obtained from the gyrometer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 6 (c) shows the position in x-direction and the position in y-direction obtained from the acceleration data upon compensating the plurality of correction functions in accordance with an embodiment of the present disclosure;

Figure 1:
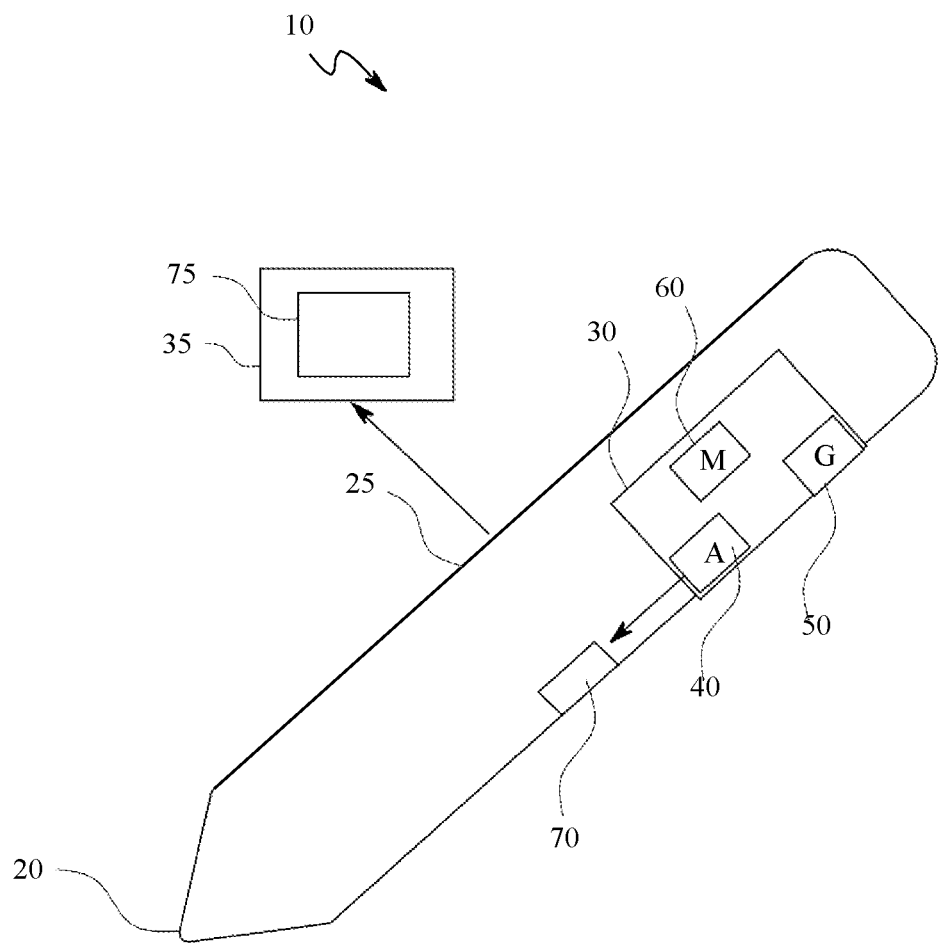
FIG. 1 is a schematic representation of an electronic writing device in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an electronic writing device. The electronic writing device includes a tip configured to enable writing on a physical surface. The electronic writing device also includes an electronic chip housed in a body of the electronic writing device and coupled to the tip. The electronic chip includes an accelerometer configured to record an acceleration data of the electronic writing device when writing on the physical surface. The electronic chip also includes a gyrometer configured to generate a rotation data corresponding to rotation of the electronic writing device. The electronic writing device further includes a communication module operatively coupled to the electronic chip. The communication module is configured to send data received from the electronic chip to an external processing medium.

FIG. 1 is a schematic representation of an electronic writing device 10 in accordance with an embodiment of the present disclosure. The electronic writing device 10 includes a pen shaped writing device. In one embodiment, the electronic writing device 10 may include a stylus. As used herein, the stylus is a pen-shaped instrument which is used to input one or more commands to a computer screen, mobile device or graphics tablet. With touchscreen devices, a user places a stylus on the surface of the screen to make selections by tapping the stylus on the screen. The electronic writing device 10 includes a tip 20 which is configured to enable writing on a physical surface. In one embodiment, the physical surface may include a paper, a board or a screen such as a touch screen medium. In another embodiment, the physical surface may include a curved surface with a pre-defined shape. The electronic writing device 10 also includes an electronic chip 30 which is housed in a body 25 of the electronic writing device 10. The electronic chip 30 is operatively coupled to the tip 20 of the electronic writing device 10. The electronic chip 30 includes an accelerometer 40 configured to record an acceleration data of the electronic writing device 10 when writing on the physical surface. The electronic chip 30 also includes a gyrometer 50 configured to generate a rotation data corresponding to rotation of the electronic writing device 10. In some embodiments, the electronic chip 30 may include a magnetometer 60 which is configured to compensate for rotation and angular orientation of the electronic writing device 10.

The electronic writing device 10 further includes a communication module 70 which is operatively coupled to the electronic chip 30. The communication module 70 is configured to send data received from the electronic chip 30 to an external processing medium 35. In one embodiment, the communication module 70 may include a Wi-Fi module, a Bluetooth module, a near field communication (NFC) module, a radio frequency (RF) module or a universal serial bus (USB) cable. In a preferred embodiment, the communication module 70 may be configured to communicate with a cloud based server platform. In another embodiment, the communication module 70 may be configured to communicate with a local server platform. In one embodiment, the electronic writing device 10 may include a rechargeable battery (not shown in FIG. 1) operatively coupled to the electronic chip 30 and the communication module 70. The rechargeable battery is configured to supply energy to the electronic chip 30 and the communication module 70. In a specific embodiment, the external processing medium may include a processor 75 which may be hosted on the cloud based server platform or the local server platform.

In one embodiment, the processor 75 may be configured to receive the data from the communication module 30. Furthermore, the processor 75 may generate a writing data corresponding to the acceleration data and the rotation data. In such embodiment, the processor 75 is configured to detect a contact of the electronic writing device 10 with the physical surface and calculate a change in position of the electronic writing device 10 during contact of the electronic writing device 10 with the physical surface. A point of contact with the physical surface becomes a start point for calculating the change in position of the electronic writing device 10. In some embodiments, the processor 75 may also be configured to correct a shape of a text written in one or more input strokes by the electronic writing device 10, recognize one or more characters in a text, recognise one or more words made from one or more recognised characters in the text, convert handwritten texts into digital texts based on the recognised one or more words, perform character matching and perform user authentication. One embodiment of detection of the contact of the electronic writing device 10 with the physical surface is described in FIG. 2.

Figure 2:
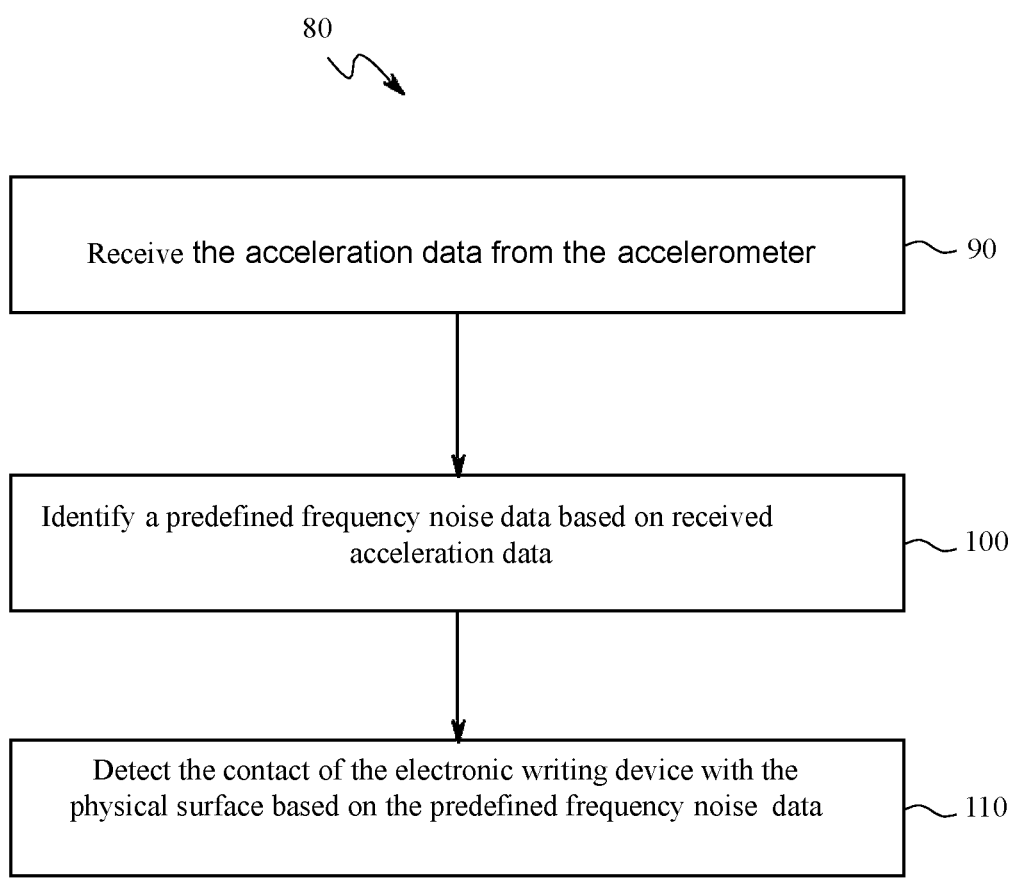
FIG. 2 is a flow chart representing the steps involved in a method to detect contact of the electronic writing device with the physical surface in accordance with an embodiment of the present disclosure.

FIG. 2 is a flow chart representing the steps involved in a method 80 to detect contact of the electronic writing device with the physical surface in accordance with an embodiment of the present disclosure. The method 80 includes receiving the acceleration data from the accelerometer in step 90. The method 80 also includes identifying a predefined frequency noise data based on received acceleration data in step 100. The method 80 further includes detecting the contact of the electronic writing device with the physical surface based on the predefined frequency noise data in step 110. One exemplary embodiment of detection of the contact of the electronic writing device with the physical surface is explained in FIG. 3 (*a*) and FIG. 3 (*b*).

Figure 3A:
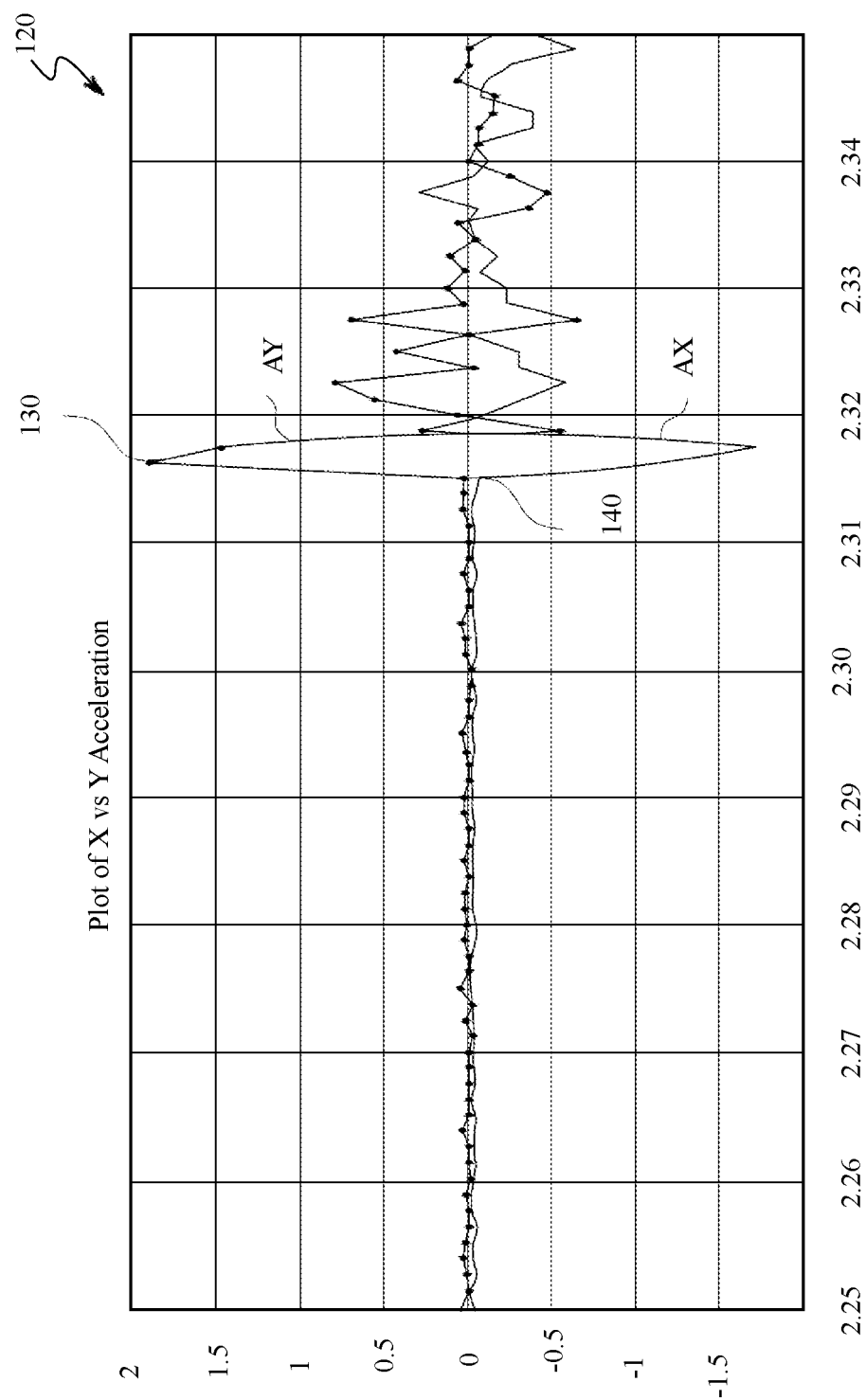
FIG. 3(a) is a graphical representation of the acceleration data of accelerometer of FIG. 1, represents the detection of the contact of the electronic writing device on the physical surface when starting the writing on the physical surface in accordance with an embodiment of the present disclosure.
Figure 3B:
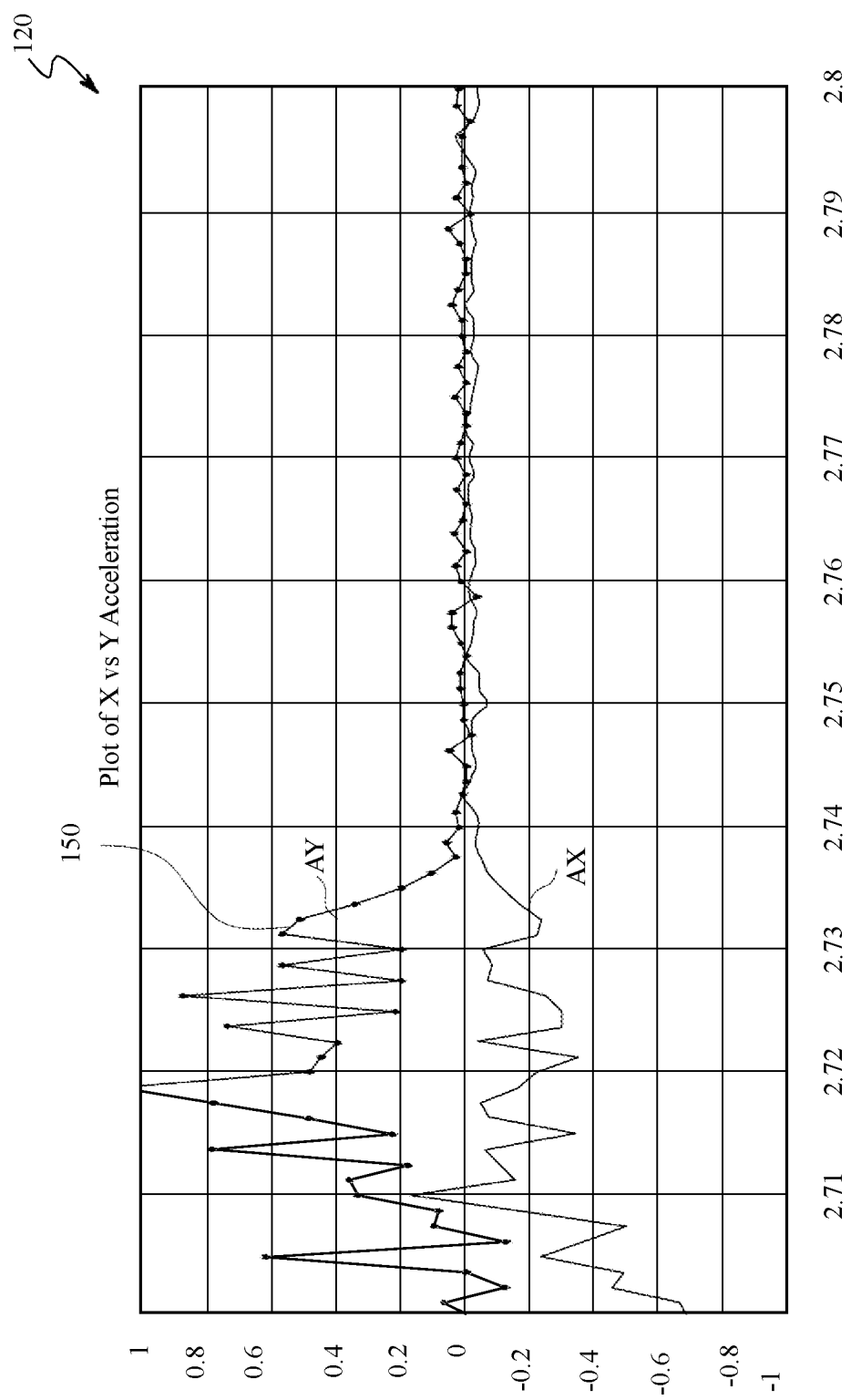
FIG. 3(b) is a graphical representation of the acceleration data of accelerometer of FIG. 1, represents the detection of the contact of the electronic writing device on the physical surface when ending the writing on the physical surface in accordance with an embodiment of the present disclosure.

FIG. 3(*a*) is a graphical representation 120 of the acceleration data of accelerometer of FIG. 1, represents the detection of the contact of the electronic writing device 10 on the physical surface when starting the writing on the physical surface. The plot represents the acceleration in two directions/dimensions with respect to time. A first point 130 on the plot where acceleration in x-direction (Ax) and acceleration in y-direction (Ay) reaches to a first predefined acceleration value 140 after a zero value is detected as a start contact point. Similarly, FIG. 3(*b*) is a graphical representation 120 of the acceleration data of accelerometer of FIG. 1, represents the detection of the contact of the electronic writing device on the physical surface when ending the writing on the physical surface. A second point 150 on the plot where acceleration in x-direction (Ax) and acceleration in y-direction (Ay) reaches to a second predefined acceleration value before a zero value is detected as an end contact point.

Figure 4:
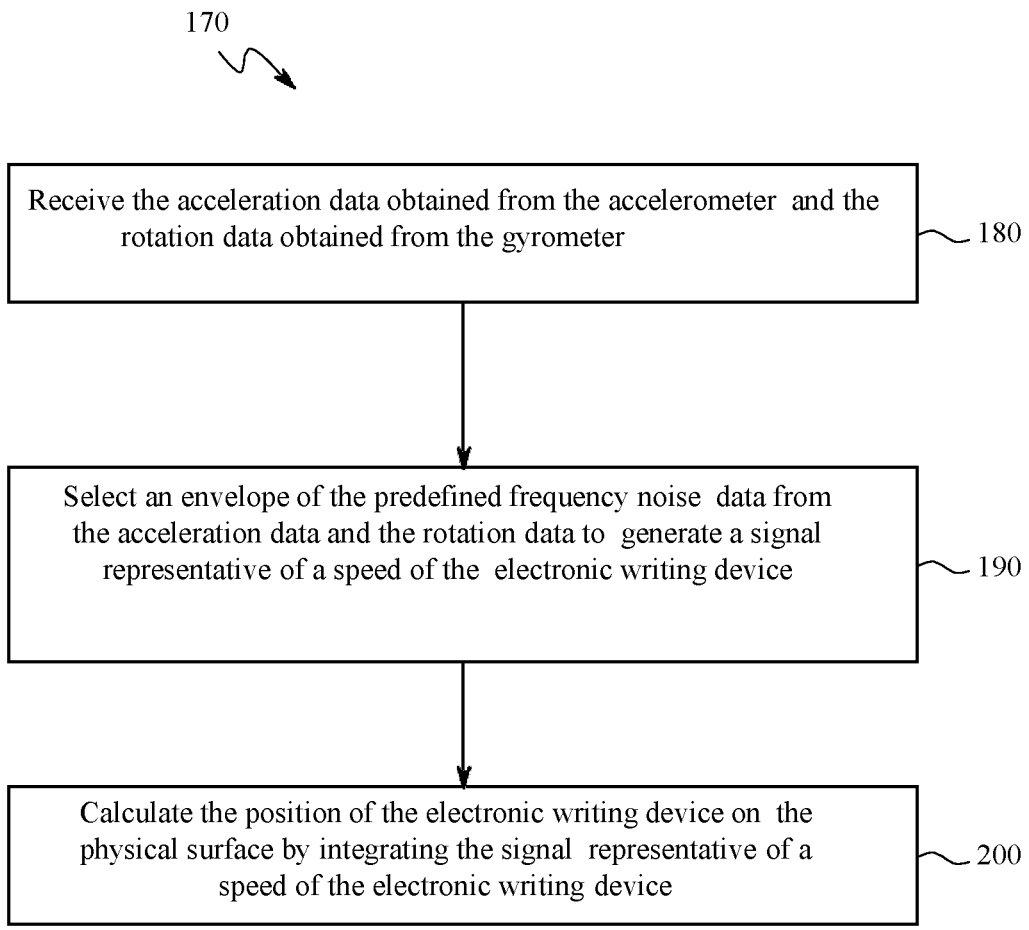
FIG. 4 is a flow chart representing the steps involved in a method to detect a position of the electronic writing device on the physical surface in accordance with an embodiment of the present disclosure.

FIG. 4 is a flow chart representing the steps involved in a method 170 to detect a position of the electronic writing device on the physical surface in accordance with an embodiment of the present disclosure. The method 170 includes receiving the acceleration data obtained from the accelerometer and the rotation data obtained from the gyrometer in step 180. The method 170 further includes selecting an envelope of the predefined frequency noise data from the acceleration data and the rotation data to generate a signal representative of a speed of the electronic writing device in step 190. The method 170 further includes calculating the position of the electronic writing device on the physical surface by integrating the signal representative of a speed of the electronic writing device in step 200. The integration results in the plurality of correction functions which is explained by the below mentioned equations:

$$d^2X(t)/dt^2 = A_x(t)$$

$$X(t) = \iint Ax(t) dt \cdot dt$$

$$X_c(t) = X(t) + g_{1X} \cdot C_{1x}(t) + g_{2X} \cdot C_{2x}(t) \quad (1a)$$

Similarly, $$d^2Y(t)/dt^2 = Ay(t)$$

$$Y(t) = \iint Ay(t) dt \cdot dt$$

$$Y_c(t) = Y(t) + g_{1Y} \cdot C_{1y}(t) + g_{2Y} \cdot C_{2y}(t) \quad (1b)$$

Figure 5:
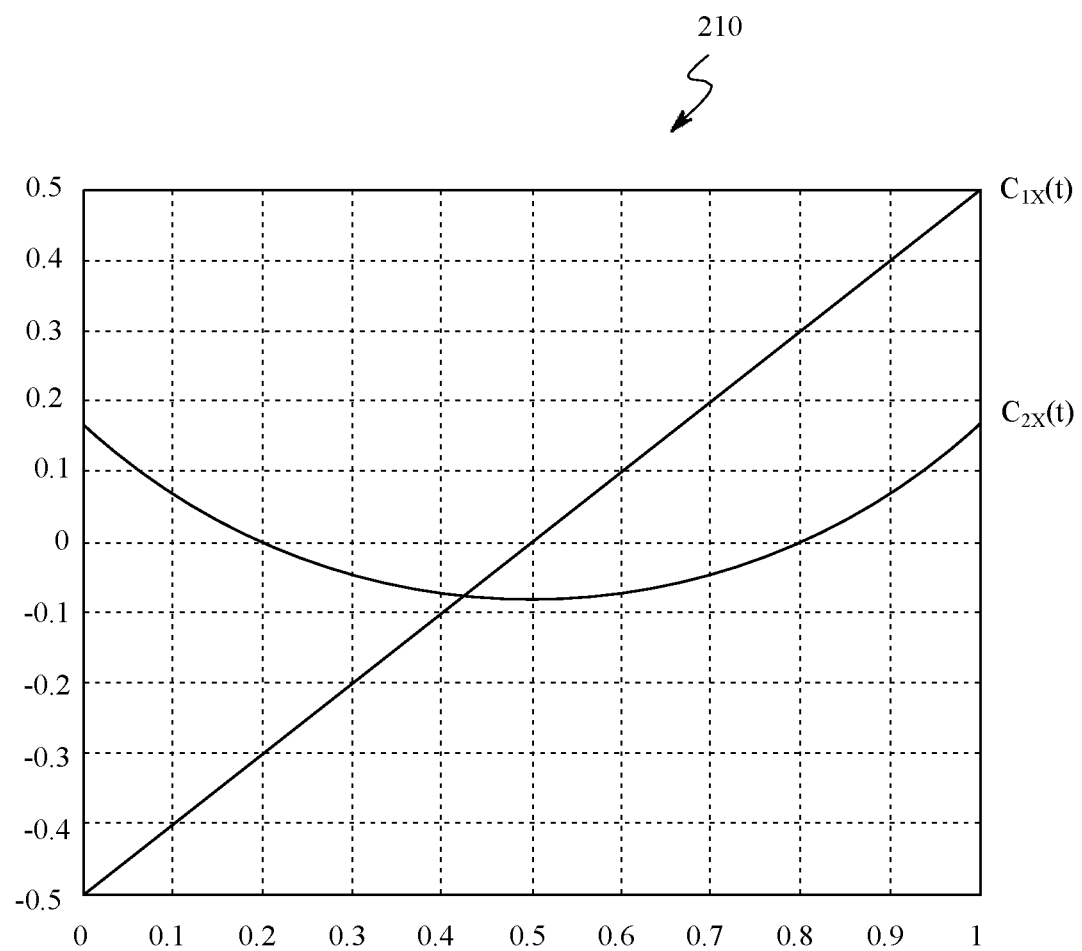
FIG. 5 is a schematic representation of one embodiment of FIG. 1, depicts orthogonal correction functions in accordance with an embodiment of the present disclosure.

Here, $C_{X1}$, $C_{X2}$, $C_{Y1}$ and $C_{Y2}$ are the correction functions and the above-mentioned coefficients $g_{1X}$, $g_{2X}$, $g_{1Y}$ and $g_{2Y}$ are selected to improve the shape of the text. Assuming writing from left to right the $g_{1Y}$ term sets an average slope of the writing and the $g_{2Y}$ term sets the curvature of the writing. The $g_{1X}$ term may be set by examining the velocity in the x-direction and ensuring that the velocity is positive on average within a predefined limit. X(t) is a distance travelled by the electronic writing device in x-direction and Y(t) is a distance travelled by the electronic writing device in y-direction. In one embodiment, the plurality of correction functions may include an orthogonal correction function 210 as shown in FIG. 5. As used herein, the orthogonal correction function belongs to a function space which is a vector space which has a bilinear form.

Referring to FIG. 4, in a preferred embodiment, the method 170 further includes calculating the position of the electronic writing device on the physical surface when the speed of the electronic writing device is approximately zero at the start point and the end point of the contact. The start point corresponding to a starting position of the electronic writing device on the physical surface may be selected arbitrarily, however, a velocity corresponding to the starting position may be estimated by integrating the acceleration data obtained from the accelerometer. The velocity corresponding starting position may be chosen to be zero as a horizontal velocity, when the electronic writing device touches the physical surface, may be approximately close to zero. In such embodiment, the speed reducing to zero may be predicted by detecting a plurality of minimum value points in the predefined frequency noise data. One exemplary embodiment to detect the position of the electronic writing device on the physical surface is explained in FIGS. 6 (*a*), 6 (*b*) and 6 (*c*).

Figure 6A:
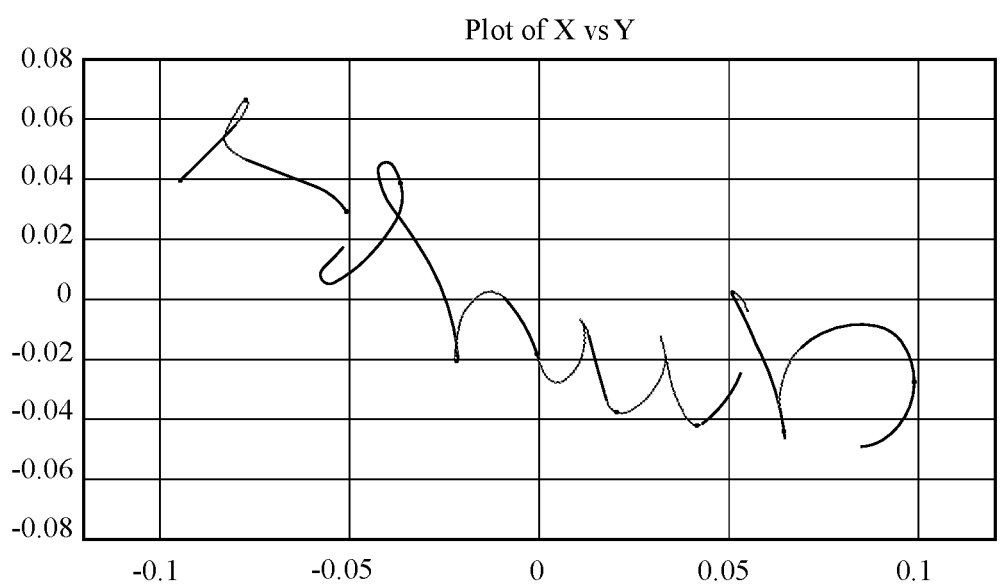
FIG. 6 (a) is a schematic representation of an exemplary embodiment of FIG. 4, depicts a text written using the electronic writing device in accordance with an embodiment of the present disclosure.
FIG. 6(b) shows the position in x-direction and the position in y-direction obtained from the acceleration data without compensating the plurality of correction functions in accordance with an embodiment of the present disclosure.
Figure 6B:
Figure 6C:
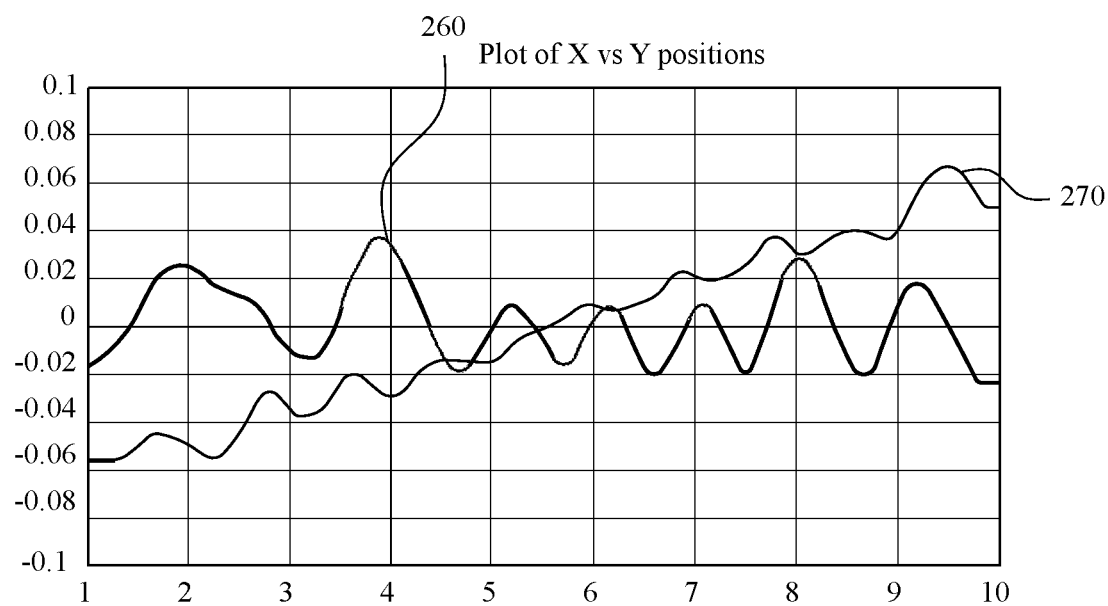

FIG. 6 (*a*) is a schematic representation of an exemplary embodiment of FIG. 4, depicts a text 230 written using the electronic writing device in accordance with an embodiment of the present disclosure. The signal representative of speed may be used to create a plurality of correction functions obtained by double integrating the acceleration data obtained while writing the text 230 "shub". For example, the text 230 "shub" is written from left to right direction. The coefficient $g_{1X}$ (equation 1a) sets an average slot of the writing and $g_{1X}$ may be set by evaluating the speed of the electronic writing device in the x-direction. FIG. 6(*b*) shows the position in x-direction 240 and the position in y-direction 250 obtained from the acceleration data without compensating the plurality of correction functions. FIG. 6 (*c*) shows the position in x-direction 260 and the position in y-direction 270 obtained from the acceleration data upon compensating the plurality of correction functions in x-direction and y-direction. In one embodiment, $C_{1x}$, $C_{1y}$ and $C_{2y}$ correction functions from the plurality of correction functions are compensated to obtain an adequate shape of a character written by the electronic writing device. In another embodiment, each of the plurality of correction functions such as $C_{1x}$, $C_{2x}$, $C_{1y}$ and $C_{2y}$ are compensated to obtain an adequate shape of a character written by the electronic writing device. The plurality of correction functions is compensated by computing a plurality of weights for the plurality of correction functions based on a first set of parameters. In one embodiment, the first set of parameters may include a total distance travelled by the electronic writing device, the speed of the writing, a moment of displacement and an area enclosed or covered by the text.

The total distance travelled by the electronic writing device 10 is calculated using the below mentioned equation:

$$D = \int_0^T (\dot{X}^2 + \dot{Y}^2)^{1/2} dt \quad (2)$$

Here, $\dot{X}$ is the acceleration in x-direction and $\dot{Y}$ is the acceleration in y-direction.

The speed of writing using the electronic writing device 10 is calculated by the below mentioned equation:

$$S = (\dot{X}^2 + \dot{Y}^2)^{1/2} \quad (3)$$

Similarly, here, $\dot{X}$ is the acceleration in x-direction and $\dot{Y}$ is the acceleration in y-direction.

The moment of displacement is calculated by using the below mentioned equation:

$$M = \int_0^T (X^2 + Y^2) dt \quad (4)$$

Here, X is the position in x-direction and Y is the position in y-direction.

The area enclosed by the shape of the text 230 is calculated using the below mentioned equation:

$$A = \int_0^T (|\dot{Y}X| + |Y\dot{X}|) dt \quad (5)$$

In a specific embodiment, the plurality of weightage for the plurality of correction functions computed based on the speed of the writing which may include a negative correlation between a curvature of the text and speed of the writing. The relation between the curvature and the speed of writing is derived from the below mentioned equation:

$$\text{Speed} = \{dX/dt^2 + dY/dt^2\}^{1/2} = \{V_x^2 + V_y^2\}^{1/2}$$

$$\text{Curvature} = d^2Y/dX^2 = \{\dot{X}\ddot{Y} - \dot{Y}\ddot{X}\}/\{\dot{X}^2 + \dot{Y}^2\}^{3/2}$$

$$\text{Curvature} = \{V_X A_Y - V_Y A_X\}/\{V_x^2 + V_y^2\}^{3/2}$$

$$\text{Curvature}^2 \cdot \text{Speed}^3 = \int_0^T \{V_X A_Y - V_Y A_X\}^2 dt$$

Here, Vx and Vy is velocity of electronic writing device 10 is x-direction and y-direction respectively.

Figure 7:
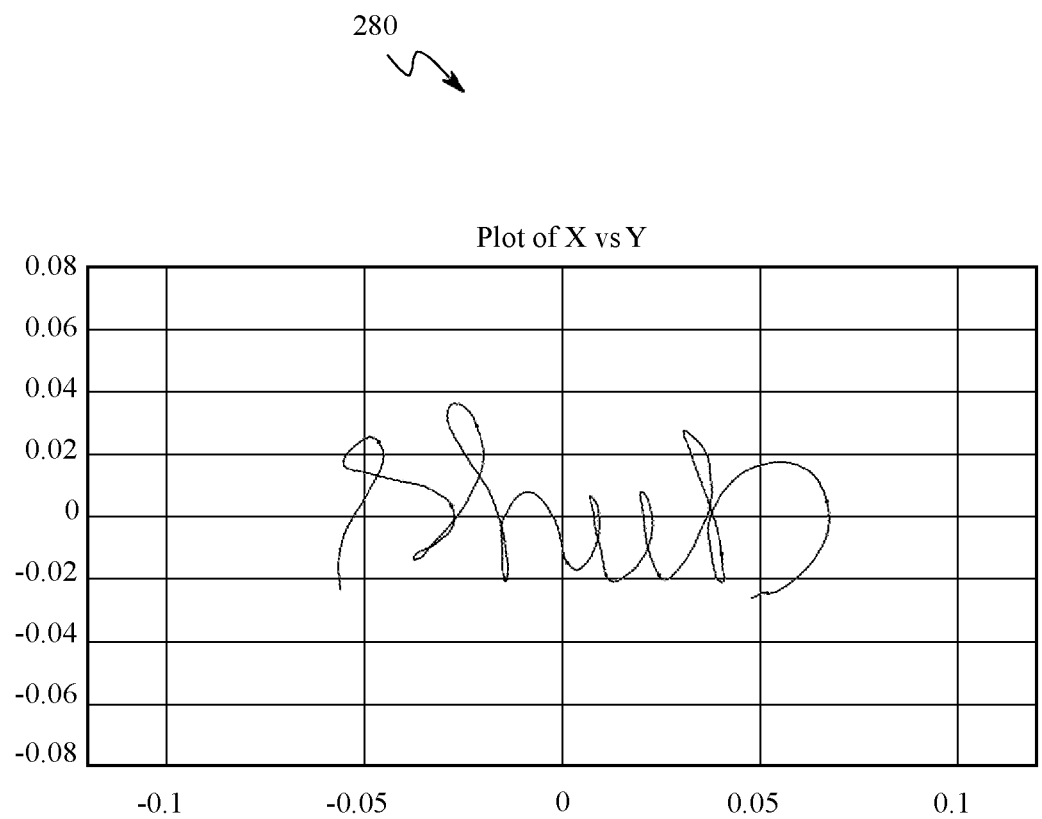
FIG. 7 is a schematic representation of one embodiment of FIG. 6 (a), depicting a corrected shape of the text written by the electronic writing device in accordance with an embodiment of the present disclosure.

FIG. 7 is a schematic representation of one embodiment of FIG. 6 (a), depicting a corrected shape 280 of the text 230 written by the electronic writing device in accordance with an embodiment of the present disclosure. The shape and orientation of the text "shub" is corrected based on the one or more parameters. The one or more parameters may include a centroid of the text, an average displacement of the text, an average horizontal velocity of the electronic writing device and an average vertical velocity of the electronic writing device. The orientation is known using the acceleration of gravity which is always vertical. The orientation may change due to bending which is detected by the gyroscope and additionally by a magnetometer. For example, a user may hold the electronic writing device 10 and rotated in a manner that the recreated writing may not be horizontal in a line from left to right (for languages like English) but at an angle. Such orientation may be corrected knowing that the user is writing in a language like English. Any rotation of the electronic writing device 10, while in the act of writing, is captured by the gyroscope and also compensated.

Equations relative to horizontal motion (x-direction) of the electronic writing device 10 is described below:

$$\text{centroid of text to origin } X = X - \frac{1}{T} \int_0^T X dt \quad (6a)$$

$$\text{average displacement } V_X = V_X - \frac{1}{T} \int_0^T V_X dt + d_x \quad (7a)$$

$$\text{average velocity } A_X = A_X - \frac{1}{T} \int_0^T A_X dt + v_x \quad (8a)$$

Here, T is a time interval in which a word or a letter is written by the electronic writing device 10.

Equations relative to vertical motion (y-direction) of the electronic writing device 10 is described below:

$$\text{centroid of text to origin } Y = Y - \frac{1}{T} \int_0^T Y dt \quad (6b)$$

$$\text{average displacement } V_Y = V_Y - \frac{1}{T} \int_0^T V_Y dt + d_Y \quad (7b)$$

$$\text{average velocity } A_Y = A_Y - \frac{1}{T} \int_0^T A_Y dt + v_Y \quad (8b)$$

Referring to FIG. 1, in one embodiment, the processor 75 is also configured to recognize one or more characters in the text based on a plurality of sequences of the position of the electronic writing device 10 on the physical surface. As used herein, the character may include a numeric character, an alphabetic character, a special character and the combination thereof. The plurality of sequences of the position of the electronic writing device 10 on the physical surface may form the input strokes from a user. In another embodiment, a probability distribution function is calculated to estimate a succeeding position of the electronic writing device 10 on the physical surface using a Kalman filter and a time warp technique. As used herein, Kalman filter is a method that uses a series of measurements observed over time, containing statistical noise and other inaccuracies, and produces estimates of unknown variables that tend to be more accurate than those based on a single measurement alone, by estimating a joint probability distribution over the variables for each timeframe. As used herein, the time warp is a technique to find the best possible mapping from time t to time t' such that the error squared cost function J is minimized. In such embodiment, the processor 75 is also configured to correct a plurality of errors in one or more recognized characters based on at least one of an offset correction, a size correction, the plurality of correction functions and a time scale correction. In one embodiment, the processor 75 may also be configured to correct a plurality of errors in one or more recognized characters to identify the next letter in a word while writing. In some embodiments, the processor 75 may also be configured to correct a plurality of errors in one or more recognized characters to identify a succeeding word while writing a sentence.

In another embodiment, the processor 75 is also configured to form one or more words based on the recognized one or more characters in the text. In such embodiment, the word may be formed based on one or more input strokes. For example, if three input strokes correspond to a single word, the processor 75 may identify the single word using a dictionary including a probability distribution of a next character of the text.

In yet another embodiment, the processor 75 is also configured to ignore overwriting in the one or more input strokes using the dictionary including a probability distribution of a next character of the text. In such embodiment, the overwriting in the one or more input strokes may be ignored by identifying the position of the electronic writing device 10 on the physical surface and a sequence of writing. For example, when the user writes a numeral '8', the one line crosses the other line to complete the numeral. The processor 75 may receive a predefined information including how people write (crosses one line with other line instead of jumping the lines) and the sequence of writing to ignore overwriting.

In an embodiment, the processor 75 is configured to frame one or more sentences from the one or more formed words even if the words are written are not in a single reference line. In such embodiment, the processor 75 may be configured to frame the one or more sentences from the one or more formed words by identifying a time to reach to the next line and sequence of the word.

Figure 8:
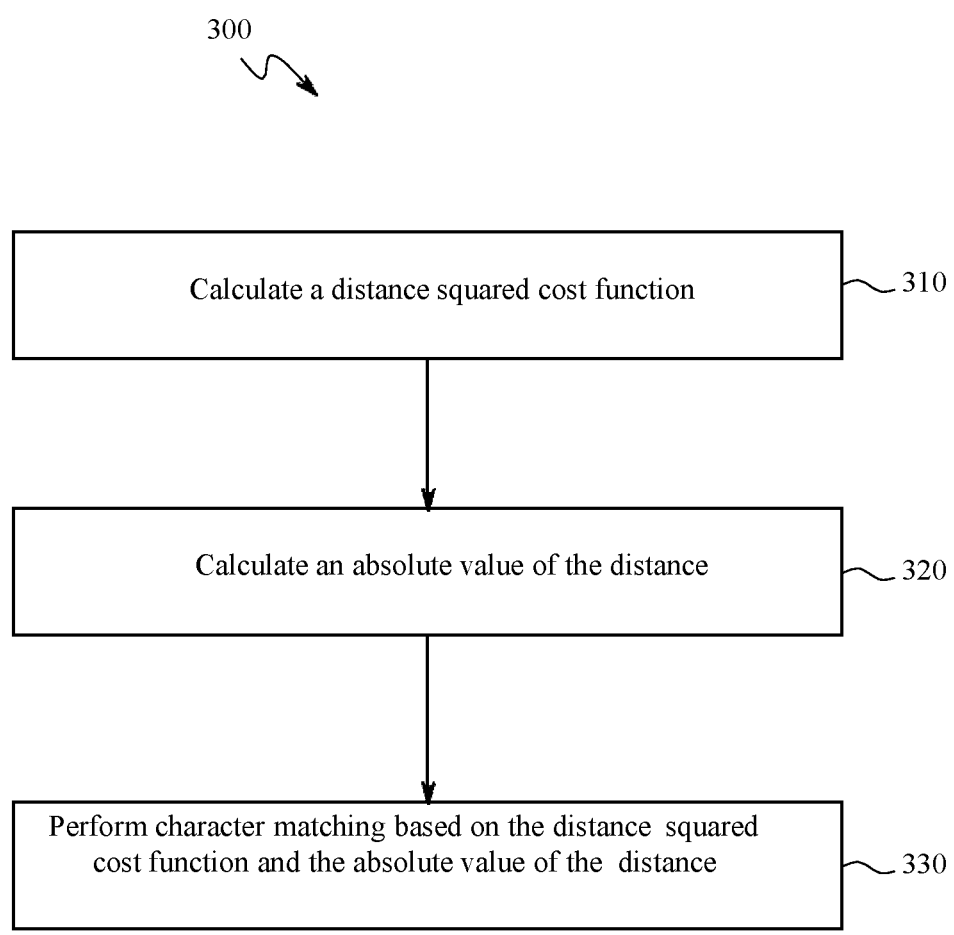
FIG. 8 is a flow chart representing the steps involved in a method of character matching in accordance with an embodiment of the present disclosure.

FIG. 8 is a flow chart representing the steps involved in a method 300 of character matching in accordance with an embodiment of the present disclosure. The method 300 includes calculating a distance squared cost function in step 310. The method 300 also includes calculating an absolute value of the distance in step 320. The method 300 further includes performing character matching based on the distance squared cost function and the absolute value of the distance in step 330. In one embodiment, the method 300 may include performing character matching using a dictionary. The dictionary includes a probability distribution of a next character of the text. In some embodiments, the method 300 may include improving character matching using one or more of an offset correction, a size correction, a time scale correction and a correction using a plurality of orthogonal correction functions. One such exemplary embodiment of character matching is explained in FIG. 9.

Figure 9:
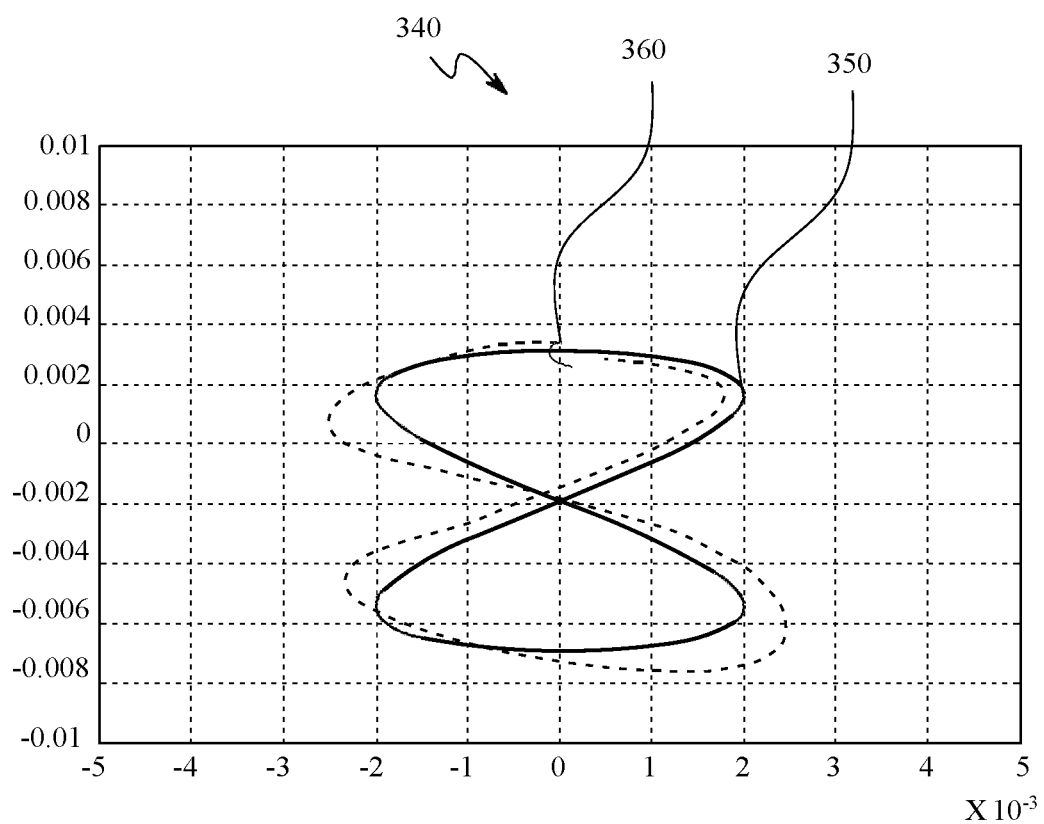
FIG. 9 is a schematic representation of an exemplary embodiment of the character matching in accordance with an embodiment of the present disclosure.

FIG. 9 is a schematic representation of an exemplary embodiment of the character matching 340 in accordance with an embodiment of the present disclosure. A numeral '8' is drawn using the electronic writing device 10. The numeral '8' 350 is reference numeral and the numeral '8' 360 is an actual numeral written using the electronic writing device. To perform the matching between the reference numeral 350 and the actual numeral 360, an error squared cost function is calculated for each numeral. The error squared cost function (without time warp) in such case is defined as:

$$\text{Error Squared Cost } J \text{ (without time warp)} = \int (X(t)-X_R(t))^2 + (Y(t)-Y_R(t))^2 dt / \int (X_R(t)^2 + Y_R(t)^2) dt$$

$$\text{Error Absolute Value Cost } J = \int \{(X(t)-X_R(t))^2 + (Y(t)-Y_R(t))^2\}^{1/2} dt / \int (X_R(t)^2 + Y_R(t)^2)^{1/2} dt$$

When a difference between the error squared cost function of reference numeral 350 and the error squared cost function of the actual numeral 360 is equal to zero (J=Jr−Ja=0) then, the match is considered to be a perfect match. If the difference is not equal to zero then, the match is considered to be an imperfect match. The imperfect match may be improved by performing at least one of an offset correction, a size correction, a time scale correction and a correction using a plurality of orthogonal correction functions.

In some cases, even in absence of any error in the shape of the actual numeral '8' (X, Y) 360 and the shape of the reference numeral '8' ($X_R$, $Y_R$) 350, the timing of the writing increases the cost function.

The error squared cost function with time warp is calculated to perform the matching of characters. As used herein, the term "time warp" is defined as a technique to find the best mapping from first time interval (t) to second time interval (t') such that the cost function (J) is minimized. The first time-interval (t) represents to the time require to draw a shape of the reference numeral '8' 350 and the second time interval (t') represents the time require to draw a shape of the actual numeral '8' 360.

In such case, the error squared cost function (with time warp) is defined as:

$$\text{Error Squared Cost } J = \int (X(t')-X_R(t))^2 + (Y(t')-Y_R(t))^2 dt / \int (X_R(t)^2 + Y_R(t)^2) dt$$

$$\text{Error Absolute Value Cost } J = \int \{(X(t')-X_R(t))^2 + (Y(t')-Y_R(t))^2\}^{1/2} dt / \int (X_R(t)^2 + Y_R(t)^2)^{1/2} dt$$

Here, X(t') is a distance travelled by the electronic writing device 10 in x-direction in a second time interval (t') and Y(t') is a distance travelled by the electronic writing device 10 in y-direction in the second time interval (t') while drawing the actual numeral '8' 360. Whereas, $X_R$(t) is a distance travelled by the electronic writing device 10 in x-direction in the first time interval (t) and $Y_R$(t') is a distance travelled by the electronic writing device 10 in y-direction in the first time interval (t) while drawing the reference numeral '8' 350.

The time required to draw the shape of the actual numeral '8' 360 may be calculated using the below mentioned equation:

$$t' = t + k \int_0^t [\{X_R(t)-X(t')\}\dot{X}(t') + \{Y_R(t)-Y(t')\}\dot{Y}(t')] dt$$

Here, $\dot{X}$(t') and $\dot{Y}$(t') are velocity of electronic writing device 10 in x-direction and y-direction respectively while drawing the actual numeral '8' 360.

In the abovementioned example of numeral '8', the error squared cost function with time warp is typically about 0.01 and the error squared cost function without time warp is about 0.1 which shows that the error squared cost function with time warp gives a perfect matching result.

Figure 10:
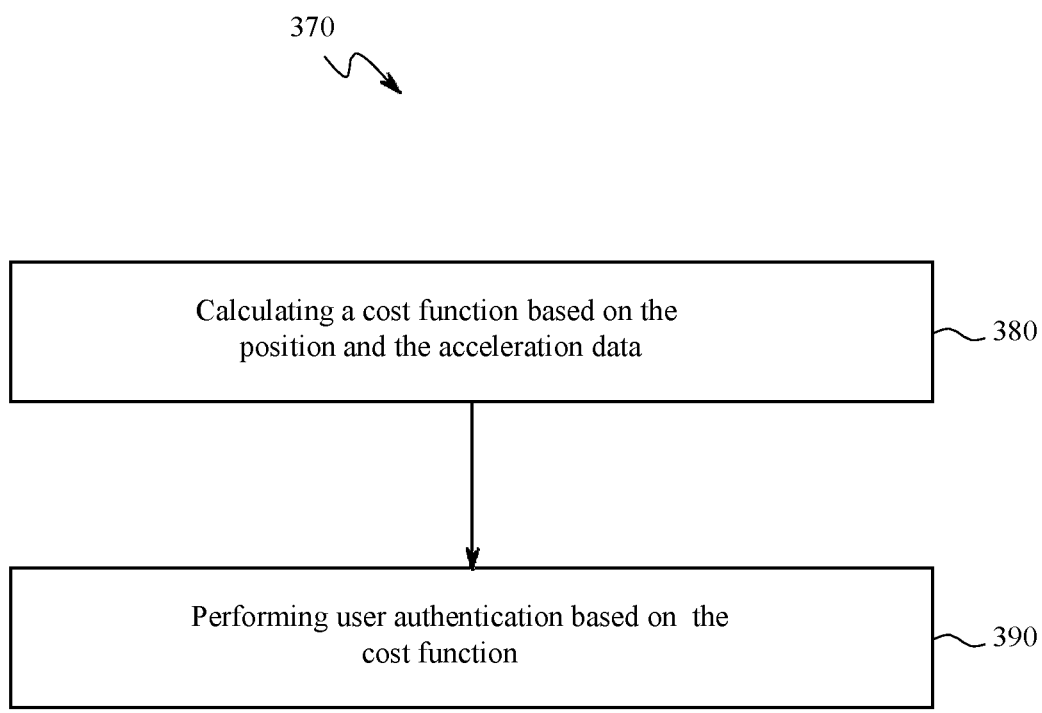
FIG. 10 is a flow chart representing the steps involved in a method for performing user authentication in accordance with an embodiment of the present disclosure.

FIG. 10 is a flow chart representing the steps involved in a method 370 for performing user authentication based on predefined character in accordance with an embodiment of the present disclosure. As used herein, the term 'user authentication' is referred here as a process or action of verifying the identity of a user. The predefined character may be a unique signature or a character or a group of a plurality of characters. The method 370 includes calculating a cost function based on the position and the acceleration data for the predefined character in step 380. In one embodiment, the cost function may be calculated by calculating a sum of the distance or a distance squared between a velocity and a reference velocity. In another embodiment, the cost function may be calculated by calculating a sum of the distance or a distance squared between an acceleration and a reference acceleration. In such embodiment, the reference velocity and the reference acceleration corresponding to the predefined character stored in the memory device.

The position based cost function may be calculated using the below mentioned equation:

$$J_P = \int (X(t')-X_R(t))^2 + (Y(t')-Y_R(t))^2 dt / \int (X_R(t)^2 + Y_R(t)^2) dt$$

$$J_P = \int \{(X(t')-X_R(t))^2 + (Y(t')-Y_R(t))^2\}^{1/2} dt / \int (X_R(t)^2 + Y_R(t)^2)^{1/2} dt$$

The velocity based cost function may be calculated using the below mentioned equation:

$$J_V = \int (V_X(t')-V_{RX}(t))^2 + (V_Y(t')-V_{RY}(t))^2 dt / \int V_{RX}(t)^2 + V_{RY}(t)^2) dt$$

$$J_V = \int \{(V_X(t')-V_{RX}(t))^2 + (V_Y(t')-V_{RY}(t))^2\}^{1/2} dt / \int \{V_{RX}(t)^2 + V_{RY}(t)^2)^{1/2} dt$$

The method 370 further includes performing user authentication based on the cost function in step 390. In one embodiment, performing the user authentication may include performing the user authentication based on the position based cost function and the velocity based cost function.

In a specific embodiment, the method 370 may include performing user authentication based on the time warp technique. In such embodiment, performing the user authentication based on the time warp technique may include performing the user authentication by identifying a time to write the character and a sequence of writing the character. One such exemplary embodiment of user authentication is described in FIG. 11.

Figure 11A:
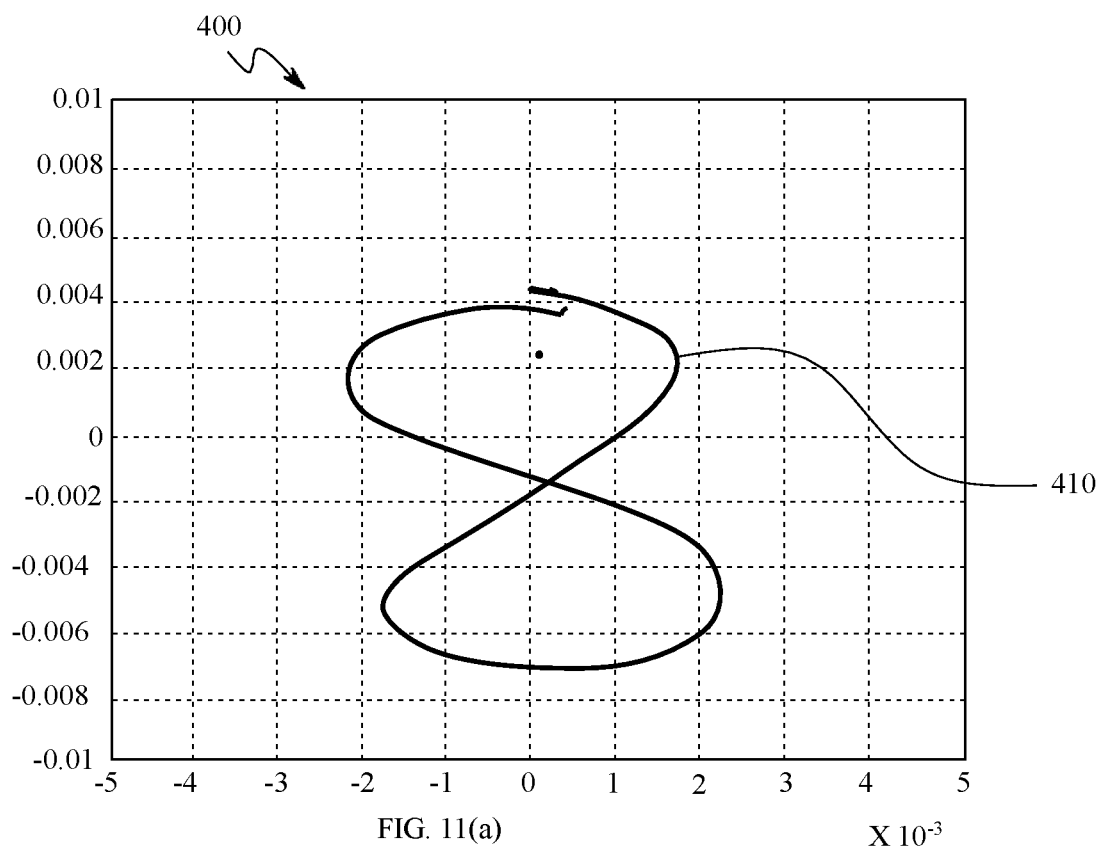
FIG. 11(a) and FIG. 11(b) represents the user authentication based on position matching and the position based cost function with different types of numeral '8' written by the same user in a same sentence respectively in accordance with an embodiment of the present disclosure.
Figure 11B:
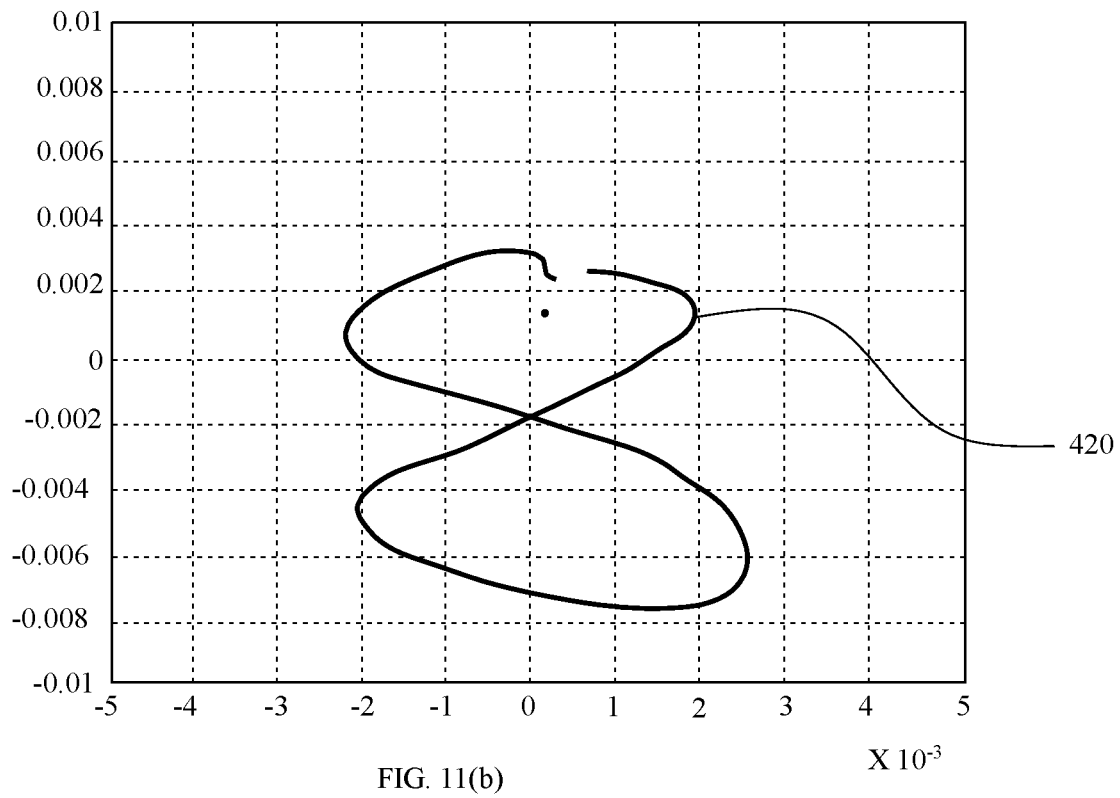
Figure 11C:
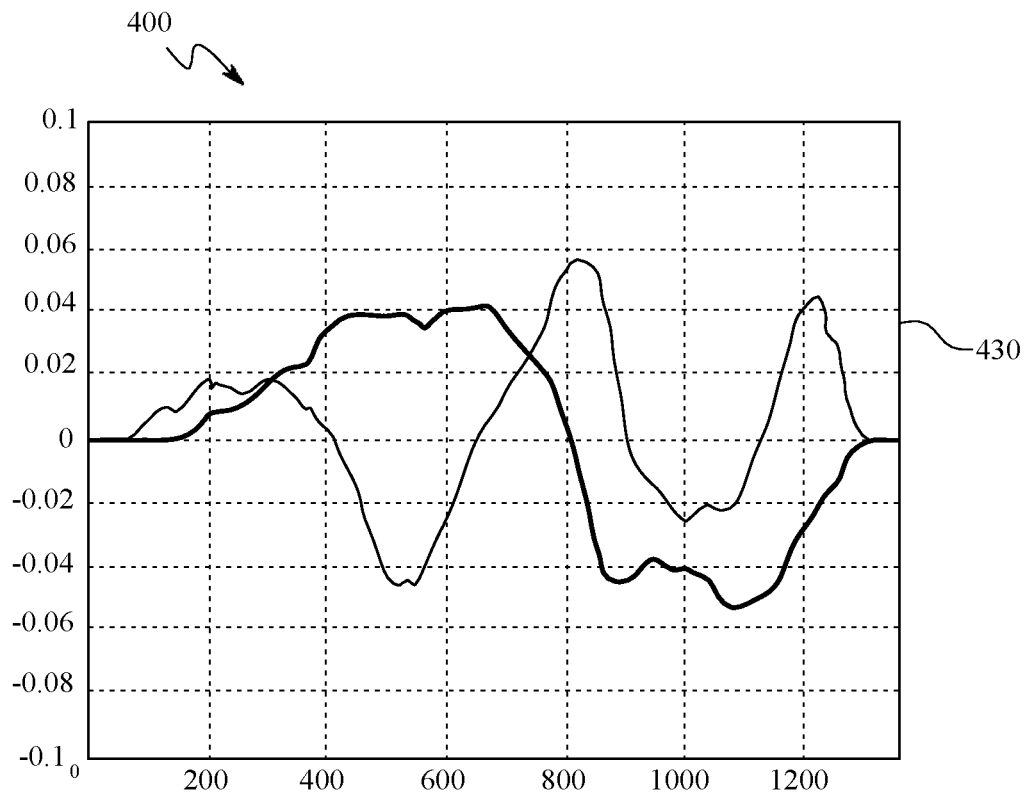
FIGS. 11(c) and 11(d) represents velocity graphs corresponding to different numeral '8' shown in FIG. 11(a) and FIG. 11(b) in x-direction and y-direction respectively in accordance with an embodiment of the present disclosure.
Figure 11D:
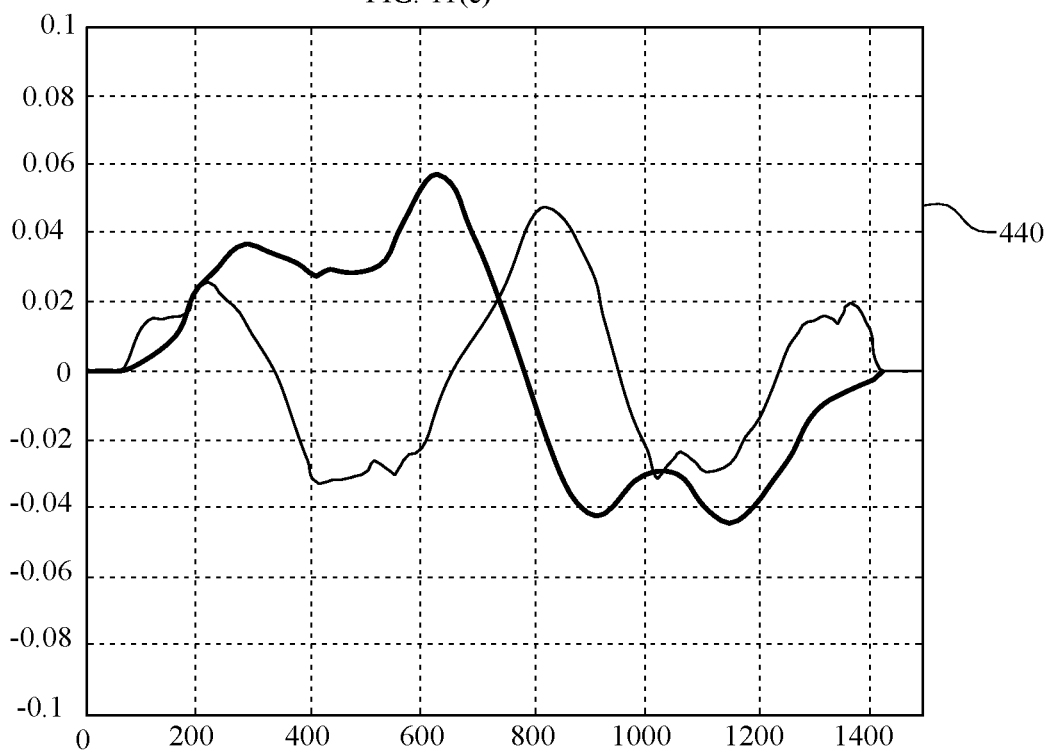

FIG. 11(a) and FIG. 11(b) represents the user authentication based on position matching and the position based cost function with different types of numeral '8' 410, 420 written by the same user in a same sentence respectively. FIGS. 11(c) and 11(d) represents velocity graph 430, 440 corresponding to different numeral '8' shown in FIG. 11(a) and FIG. 11(b) in x-direction and y-direction respectively. As shown, both the numeral '8' 410, 420 has different shape and position although same person has written both which signifies that only position matching for user authentication is insufficient. The cost function for position matching is less than 0.005 and the cost function for velocity is less than 0.05. Hence, the combination of position and velocity provides efficient user authentication for characters.

Referring back to FIG. 1, in a preferred embodiment, the processor 75 may also be configured to extract meta data associated with the writing data. In such embodiment, the meta data may include a date, a time, a plurality of pauses during writing or strokes, a size, a font, an extracted text and a Global Positioning System (GPS) location. In one embodiment, the processor 75 may also be configured to create a plurality of documents based on the meta data. In such embodiment, the plurality of documents may include a text document, a rich text document, a word processor file, a power point slide, a spreadsheet, a financial report, a balance check book and a document with financial summary. For example, the processor 75 may extract the date and time of writing, context of the written matter, size of the written matter and the like. Based on the extracted data, the processor 75 may create word file by analysing the context of the written matter which may include date and time of creation along with the file size and content of the file. In a specific embodiment, the processor 75 may be configured to create a plurality of filled forms based on the writing data and the meta data. In such embodiment, the plurality of filled forms may include a medical prescription, a food order form and a financial check copy. The processor 75 may apply heuristics to determine which fields in a form the processor 75 may auto-populate based on previously specified data by the user and the extracted meta data.

In one embodiment, the processor 75 may be configured to generate an electronic copy and a physical copy of the writing data. As used herein, the term 'electronic copy' may refer as a legible version of a piece of information not printed on a physical medium, especially as stored or displayed on a computer. Similarly, the 'physical copy' is defined as at least one of a printed copy of information from a computer and a handwritten copy. In such embodiment, the processor 75 may be configured to verify the electronic copy based on the physical copy for review. In some embodiments, the processor 75 may be configured to generate a plurality of educational metrics based on the writing data, the meta data and recreated shape received from a user. In such embodiment, the plurality of educational metrics may include one or more handwriting errors, a speed of writing and one or more spelling errors.

Figure 12:
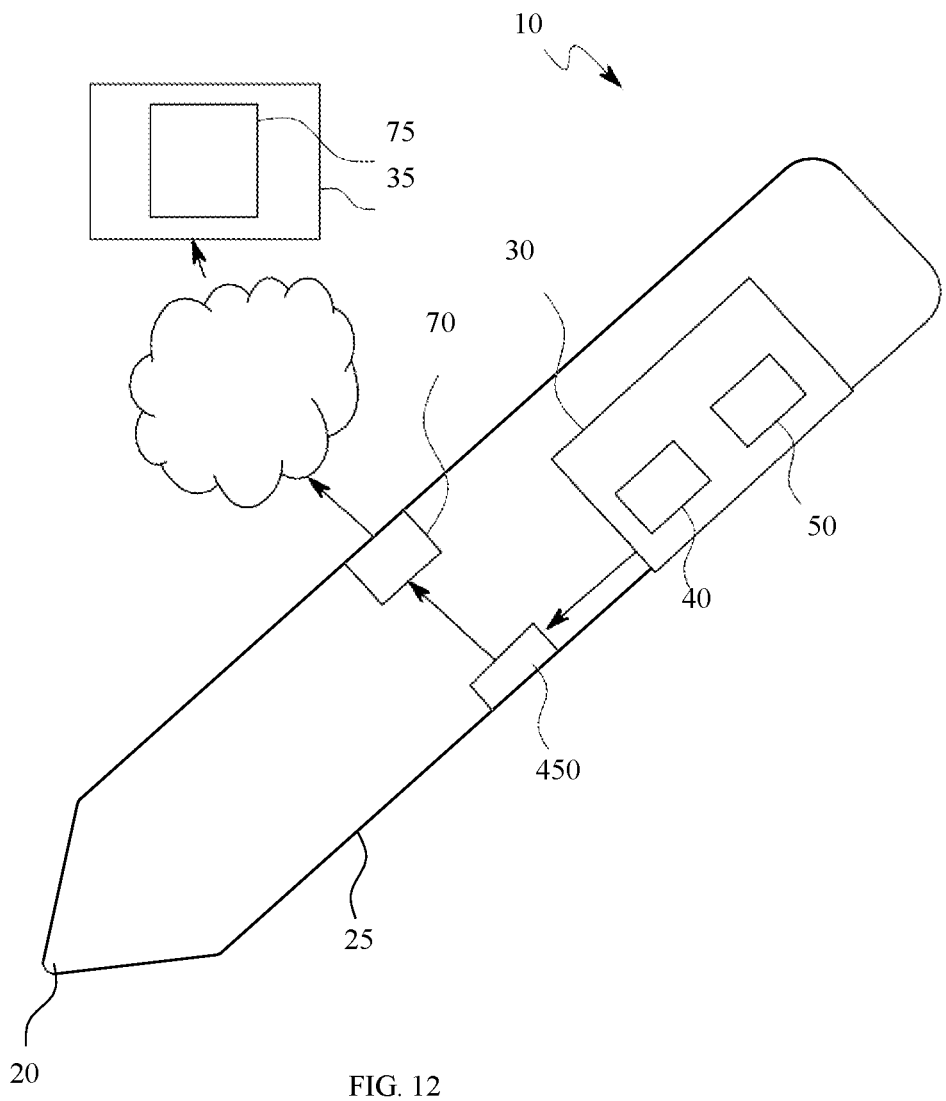
FIG. 12 is a schematic representation of an exemplary embodiment of the electronic writing device of FIG. 1 in accordance with an embodiment of the present disclosure.
Figure 13:
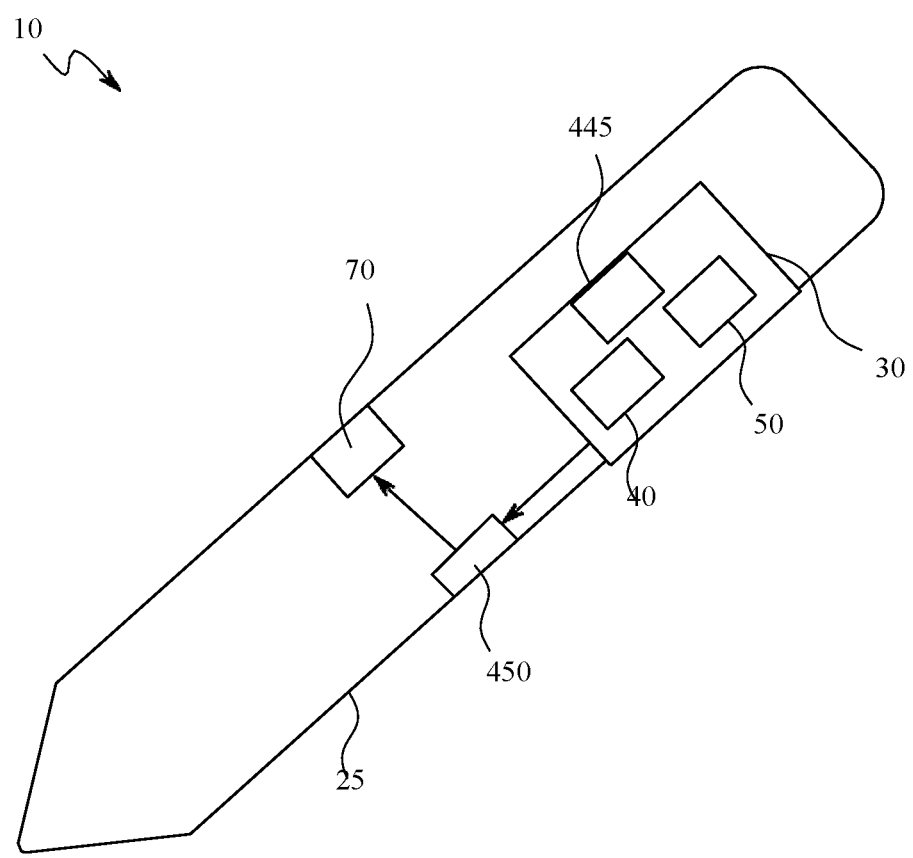
FIG. 13 is a schematic representation of an exemplary embodiment of the electronic writing device of FIG. 1 in accordance with an embodiment of the present disclosure.

FIG. 12 is a schematic representation of an exemplary embodiment of the electronic writing device 10 of FIG. 1 in accordance with an embodiment of the present disclosure. The electronic writing device 10 includes a tip 20 configured to enable writing on a physical surface. The electronic writing device 10 also includes an electronic chip 30 housed in a body 25 of the electronic writing device 10 and coupled to the tip 20. The electronic chip 30 includes an accelerometer 40 configured to record an acceleration data of the electronic writing device 10 when writing on the physical surface. The electronic chip 30 also includes a gyrometer 40 configured to generate a rotation data corresponding to rotation of the electronic writing device 10. In one embodiment, the electronic chip 30 includes a piezoelectric sensor (not shown in FIG. 12) mounted on the body 25 of the electronic writing device 10 as shown in FIG. 13. The piezoelectric sensor (FIG. 13, 445) is configured to friction force on the electronic writing device 10 and produce an electrical signal corresponding to friction force. The electrical signal is used to reconstruct the writing on the physical surface. In such embodiment, the electrical signal may be used in isolation or in combination with the accelerometer 40 to reconstruct the writing on the physical surface.

Furthermore, the electronic writing device 10 further includes a memory device 450 operatively coupled to the electronic chip 30. The memory device 450 is configured to store data representative of the user's input received from the electronic chip. The electronic writing device 10 further includes a communication module 70 operatively coupled to the memory device 450. The communication module 70 is configured to send the data stored in the memory device 450 to a communicatively connected external processing medium 35. In one embodiment, the external processing 35 medium may include a processor 75. In such embodiment, the processor may be configured to receive the data from the communication module 70. In some embodiments, the processor may also be configured to generate a writing data corresponding to the acceleration data and the rotation data received from the communication module 70.

Moreover, in a specific embodiment, the processor 75 may be further configured to detect a contact of the electronic writing device 10 with the physical surface based on a predefined frequency noise data detected from the acceleration data. In one embodiment, the processor 75 may further be configured to calculate a position of the electronic writing device 10 during contact of the electronic writing device 10 with the physical surface based on the acceleration data obtained from the accelerometer 40 and the rotation data obtained from the gyrometer 50. In some embodiments, the processor 75 may also be configured to correct a shape of a text written by the electronic writing device 10, recognize one or more characters in a text, perform character matching and perform user authentication. In a preferred embodiment, the processor 75 may also be configured to extract meta data associated with the writing data.

Figure 14:
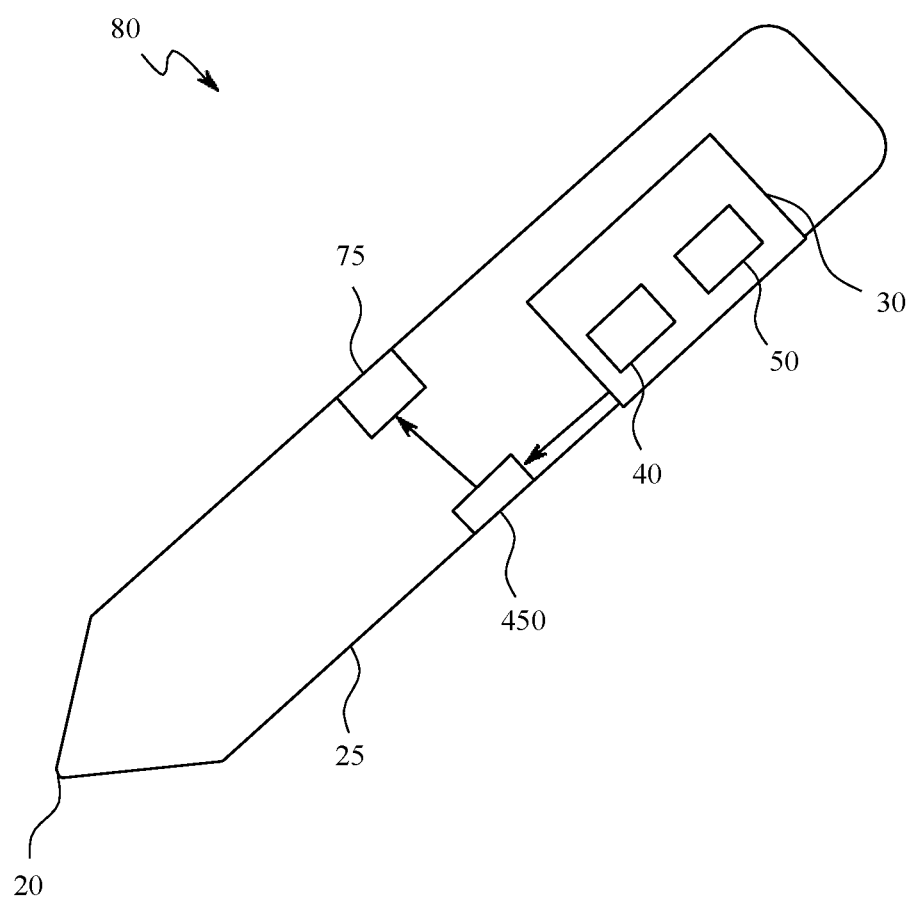
FIG. 14 is a schematic representation of another exemplary embodiment of the electronic writing device of FIG. 1 in accordance with an embodiment of the present disclosure.

FIG. 14 is a schematic representation of another exemplary embodiment of the electronic writing device 10 of FIG. 1 in accordance with an embodiment of the present disclosure. The electronic writing device 10 includes a tip 20 configured to enable writing on a physical surface. The electronic writing device 10 also includes an electronic chip 30 housed in a body 25 of the electronic writing device 10 and coupled to the tip 20. The electronic chip 30 includes an accelerometer 40 configured to record an acceleration data of the electronic writing device 10 when writing on the physical surface. The electronic chip also includes a gyrometer 50 configured to generate a rotation data corresponding to rotation of the electronic writing device 10. The electronic writing device 10 further includes a memory device 450 operatively coupled to the electronic chip 30. The memory device 450 is configured to store data received from the electronic chip 30.

Furthermore, the electronic writing device 10 includes a processor 75 operatively coupled to the memory device 450. In one embodiment, the processor 75 may include a microcontroller chip. The processor 75 is configured to retrieve a stored data from the memory device 450. The processor 75 is also configured to generate a writing data corresponding to the acceleration data and the rotation data. The processor 75 is further configured to detect a contact of the electronic writing device 10 with the physical surface based on a predefined frequency noise data detected from the acceleration data. The processor 75 is further configured to calculate a position of the electronic writing device 10 during contact of the electronic writing device 10 with the physical surface based on the acceleration data obtained from the accelerometer 40 and the rotation data obtained from the gyrometer 50. In one embodiment, the processor 75 may also be configured to correct a shape of a text written by the electronic writing device 10, recognize one or more characters in a text, perform character matching and perform user authentication. In a preferred embodiment, the processor 75 may also be configured to extract meta data associated with the writing data.

Figure 15:
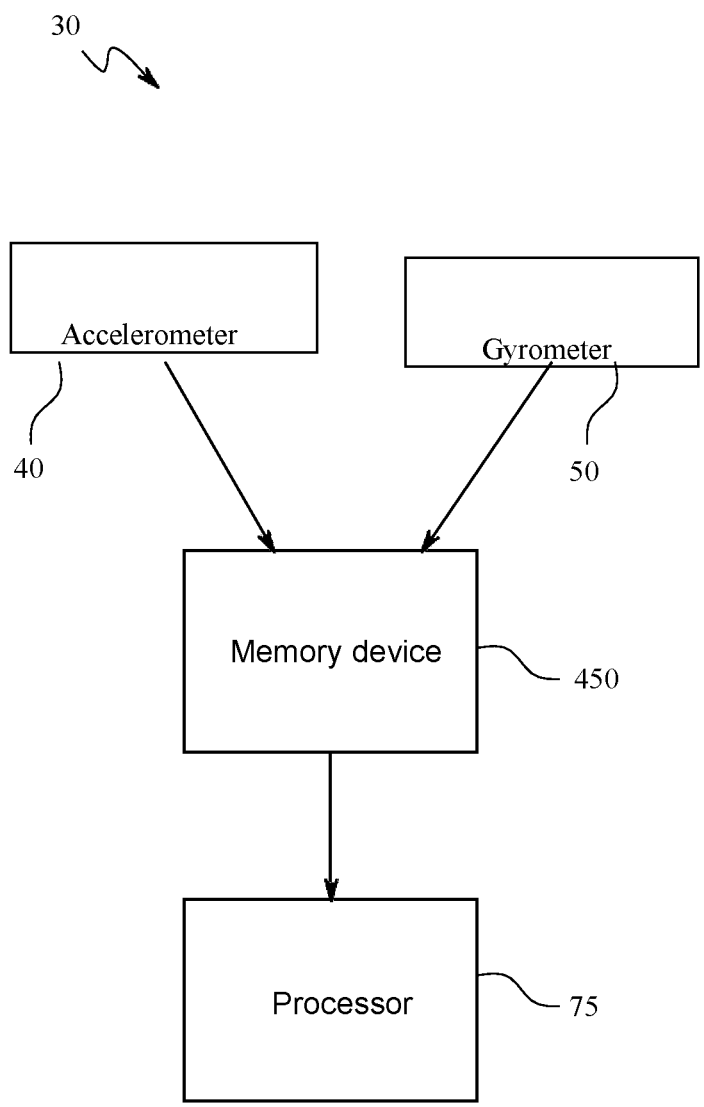
FIG. 15 is a block diagram representation of yet another exemplary embodiment of FIG. 1, depicts an electronic chip in accordance with an embodiment of the present disclosure.

FIG. 15 is a block diagram representation of yet another exemplary embodiment of FIG. 1, depicts an electronic chip 30 in accordance with an embodiment of the present disclosure. The electronic chip 30 includes an accelerometer 40 configured to record an acceleration data of an electronic writing device 10 when writing on a physical surface. The electronic chip 30 also includes a gyrometer 50 configured to generate a rotation data corresponding to rotation of the electronic writing device 10. The electronic chip 30 further includes a memory device 450 operatively coupled to the accelerometer 40 and the gyrometer 50. The memory device 450 is configured to store data received from the accelerometer 40 and the gyrometer 50. The electronic chip 30 further includes a processor 75 operatively coupled to the memory device 450. The processor 75 is configured to generate a writing data corresponding to the acceleration data and the rotation data.

Furthermore, the processor 75 is configured to detect a contact of the electronic writing device 10 with the physical surface based on a predefined frequency noise data detected from the acceleration data. The processor 75 is also configured to calculate a position of the electronic writing device 10 during contact of the electronic writing device 10 with the physical surface based on the acceleration data obtained from the accelerometer 40 and the rotation data obtained from the gyrometer 50. In one embodiment, the processor 75 may also be configured to correct a shape of a text written by the electronic writing device 10, recognize one or more characters in a text, perform character matching and perform user authentication. In a specific embodiment, the processor 75 may also be configured to extract meta data associated with the writing data.

Figure 16:
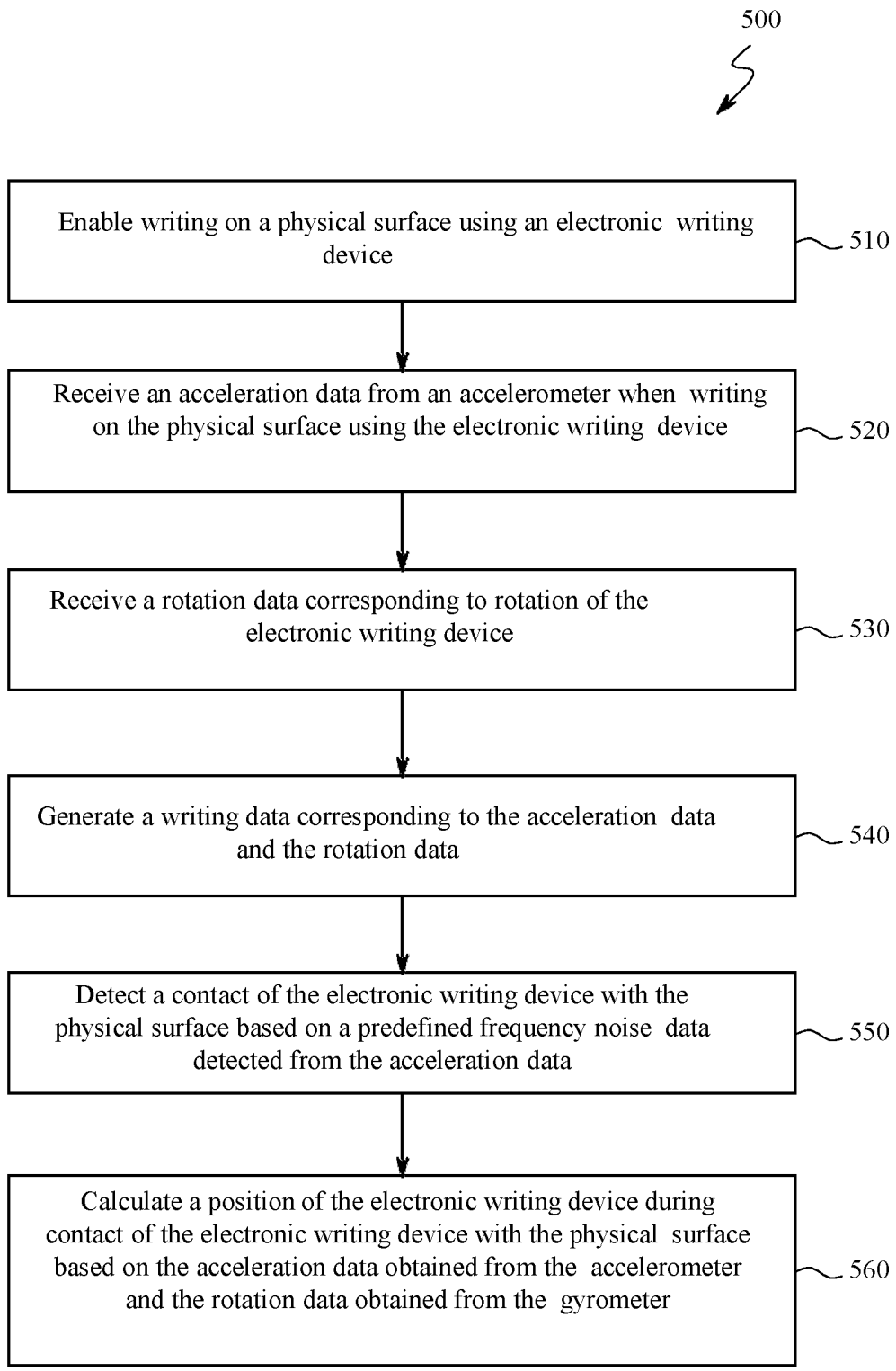
FIG. 16 is a flow chart representing the steps involved in a method to enable a plurality of functions of the electronic writing device of FIG. 1 in accordance with an embodiment of the present disclosure.

FIG. 16 is a flow chart representing the steps involved in a method 500 to enable a plurality of functions of the electronic writing device 10 of FIG. 1 in accordance with an embodiment of the present disclosure. The method 500 includes enabling writing on a physical surface using an electronic writing device in step 510. In one embodiment, enabling writing on the physical surface using the electronic writing device includes enabling writing on a paper using a pen, on a paper using a pencil, on a board using a chalk and, on a board, using a marker. The method 500 also includes receiving an acceleration data from an accelerometer when writing on the physical surface using the electronic writing device in step 520. The method 500 further includes receiving a rotation data corresponding to rotation of the electronic writing device in step 530. The method 500 further includes generating a writing data corresponding to the acceleration data and the rotation data in step 540.

The method 500 further includes detecting a contact of the electronic writing device with the physical surface based on a predefined frequency noise data detected from the acceleration data in step 550. In some embodiment, detecting the contact of the electronic writing device with the writing surface based on the predefined frequency noise data detected from the acceleration data may include detecting the contact of the writing surface with the electronic writing device at a start and an end of the writing. The method 500 further includes calculating a position of the electronic writing device during contact of the electronic writing device with the physical surface based on the acceleration data obtained from the accelerometer and the rotation data obtained from the gyrometer in step 560.

In one embodiment, calculating the position of the electronic writing device during contact of the writing device with the physical medium based on the acceleration data obtained from the accelerometer and the rotation data obtained from the gyrometer may include calculating the position of the electronic writing device during contact of the electronic writing device with the physical surface based on a friction force between the electronic writing device and the physical surface. In another embodiment, calculating the position of the electronic writing device during contact of the writing device with the physical medium based on the acceleration data obtained from the accelerometer and the rotation data obtained from the gyrometer may include calculating the position of the electronic writing device during contact of the writing device with the physical medium based on the acceleration data obtained from the accelerometer and the rotation data obtained from the gyrometer when the speed of the electronic writing device is zero at a start and an end of the contact of the electronic writing device with the physical surface.

In a specific embodiment, the method 500 may include selecting an envelope of the predefined frequency noise data from the acceleration and the rotation data to generate a signal proportional to a speed of the writing device. In a preferred embodiment, the method 500 may include creating a plurality of correction functions based on a generated signal to correct a shape of a text written by the electronic writing device. In one embodiment, the method 500 may include computing a plurality of weights for the plurality of correction functions based on a first set of parameters. The first set of parameters may include a total distance travelled by the electronic writing device, the speed of the writing, a moment of displacement and an area enclosed by the text. In such embodiment, computing the plurality of weights for the plurality of correction functions based on a first set of parameters, wherein computing the plurality of weights for the plurality of correction functions based on the first set of parameters may include computing the plurality of weights for the plurality of correction functions based on a negative correlation between a curvature of the text and speed of the writing.

In some embodiments, the method 500 may include calculating a cost function based on the curvature of the text and the speed of the writing. In such embodiment, the method 500 may include performing character matching based on a distance squared cost function and an absolute value of the distance. In another embodiment, the method 500 may include performing character matching using a dictionary. The dictionary may include a probability distribution of a next character of the text.

In a specific embodiment, the method 500 may include a user authentication based on the cost function. The cost function includes a sum of the distance or a distance squared between a velocity and a reference velocity. In another embodiment, the method 500 may include performing the user authentication based on the cost function, wherein the cost function may include a sum of the distance or a distance squared between an acceleration and a reference acceleration. In yet another embodiment, the method 500 may include performing the user authentication based on a time warp technique. In a preferred embodiment, the method 500 may include calculating a probability distribution function to estimate a succeeding position of the electronic writing device on the physical surface using a Kalman filter and the time warp technique.

In one embodiment, the method 500 may include extracting meta data associated with the writing data. In such embodiment, extracting meta data associated with the writing data may include extracting a date, a time, a plurality of pauses between writing, a size, a font, an extracted text and a Global Positioning System (GPS) location. In some embodiments, the method 500 may include creating a plurality of documents based on the meta data. In such embodiment, creating a plurality of documents based on the meta data may include creating a text document, a rich text document, a word processor file, a power point slide, a spreadsheet, a financial report, a balance check book and a document with financial summary based on the meta data. In a specific embodiment, the method 500 may include creating a plurality of filled forms based on the writing data and the meta data. In such embodiment, creating a plurality of filled forms based on the writing data and the meta data may include creating a medical prescription, a food order form and a financial check copy based on the writing data and the meta data.

In a preferred embodiment, the method 500 may include generating a plurality of educational metrics based on the writing data, the meta data and recreated shape received from a user. In such embodiment, generating the plurality of educational metrics based on the writing data, the meta data and recreated shape received from the user may include generating one or more handwriting errors, a speed of writing and one or more spelling errors based on the writing data, the meta data and recreated shape received from the user to improve the performance of the user.

Various embodiments of the electronic writing device described above enables precise detection of contact of the electronic writing device on the physical surface as since the pen's tip end is brought into contact with the handwriting surface is judged on the basis of the high-frequency component of the signals received from the accelerometer.

Also, the electronic writing device is capable of producing an electronic copy of the written document and that does not require a special writing surface such as a pad, grid, or specially marked paper. The electronic writing device is language agnostic and may work with a plurality of languages.

Furthermore, the electronic writing device provides efficient handwriting recognition capability even for the guest user as the processor linked with the electronic writing device analyse the handwriting on the basis of time of writing and the positions of the electronic writing device while writing on the physical surface rather than only based on shape.

Moreover, the electronic writing device enables combination of the data from writing with time and calendar to use the meta data to truly interface the electronic writing device to the electronic world. The electronic writing device also enables precise and efficient character matching as the electronic writing device provides time and position related analysis of the writing data.

In addition, the electronic writing device is cost effective as the device uses lesser number of electronic components as compared to the existing writing device. The device uses accelerometer to determine the position of the device on the physical surface rather than using an additional position sensor to determine the position of the device.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:
1. An electronic writing device comprising:
a tip configured to enable writing on a physical surface;
an electronic chip housed in a body of the electronic writing device and coupled to the tip, wherein the electronic chip comprises:
an accelerometer configured to record an acceleration data of the electronic writing device when writing on the physical surface;
a gyrometer configured to generate a rotation data corresponding to rotation of the electronic writing device; and
a communication module operatively coupled to the electronic chip and configured to send data received from the electronic chip to an external processing medium, wherein the external processing medium comprises a processor which is configured to create a plurality of correction functions based on a signal representative of a speed of the electronic writing device to correct a shape of a text written by the electronic writing device, and
wherein the plurality of correction functions comprises an orthogonal correction function.
2. The electronic writing device of claim 1, wherein the communication module is configured to communicate with a cloud based server platform or a local server platform.
3. The electronic writing device of claim 1, wherein the communication module comprises a Wi-Fi module, a Bluetooth module, a near field communication (NFC) module a radio frequency (RF) module or a universal serial bus (USB) cable.

4. The electronic writing device of claim 1, wherein the external processing medium comprises the processor, wherein the processor is configured to:
- receive the data from the communication module;
- generate a writing data corresponding to the acceleration data and the rotation data;
- detect a contact of the electronic writing device with the physical surface based on a predefined frequency noise data detected from the acceleration data; and
- calculate a position of the electronic writing device during contact of the electronic writing device with the physical surface based on the acceleration data obtained from the accelerometer and the rotation data obtained from the gyrometer.

5. The electronic writing device of claim 4, wherein the processor is configured to select an envelope of the predefined frequency noise data from the acceleration data and the rotation data to generate the signal representative of the speed of the electronic writing device.

6. The electronic writing device of claim 5, wherein the processor is configured to compute a plurality of weights for the plurality of correction functions based on a first set of parameters, wherein the first set of parameters comprises a total distance travelled by the electronic writing device, the speed of the writing, a moment of displacement and an area enclosed by the text.

7. The electronic writing device of claim 6, wherein the plurality of weights for the plurality of correction functions computed based on the speed of the writing comprises a negative correlation between a curvature of the text and speed of the writing.

8. The electronic writing device of claim 4, wherein the processor is configured to correct the shape of the text written by the electronic writing device based on one or more parameters.

9. The electronic writing device of claim 8, wherein the one or more parameters comprises a centroid of the text, an average displacement of the text, an average horizontal velocity of the electronic writing device and an average vertical velocity of the electronic writing device.

10. The electronic writing device of claim 4, wherein the processor is configured to recognize one or more characters in the text based on a plurality of sequences of the position of the electronic writing device on the physical surface.

11. The electronic writing device of claim 10, wherein the processor is configured to correct a plurality of errors in one or more recognized characters based on at least one of an offset correction, a size correction, the plurality of correction functions and a time scale correction.

12. The electronic writing device of claim 4, wherein the processor is configured to perform character matching based on a distance squared cost function and an absolute value of the distance.

13. The electronic writing device of claim 4, wherein the processor is configured to perform character matching using a dictionary, wherein the dictionary comprises a probability distribution of a next character of the text.

14. The electronic writing device of claim 4, wherein the processor is configured to extract meta data associated with the writing data.

15. The electronic writing device of claim 14, wherein the meta data comprises a date, a time, a plurality of pauses between writing, a size, a font, an extracted text and a Global Positioning System (GPS) location.

16. The electronic writing device of claim 14, wherein the processor is configured to create a plurality of documents based on the meta data.

17. The electronic writing device of claim 14, wherein the processor is configured to create a plurality of filled forms based on the writing data and the meta data.

18. The electronic writing device of claim 4, wherein the processor is configured to calculate a cost function based on the curvature of the text and the speed of the writing.

19. The electronic writing device of claim 18, wherein the processor is configured to perform a user authentication based on the cost function, wherein the cost function comprises a sum of the distance or a distance squared between a velocity and a reference velocity.

20. The electronic writing device of claim 19, wherein the processor is configured to perform the user authentication based on the cost function, wherein the cost function comprises a sum of the distance or a distance squared between an acceleration and a reference acceleration.

21. The electronic writing device of claim 18, wherein the processor is configured to perform the user authentication based on a time warp technique.

22. The electronic writing device of claim 4, wherein the processor is configured to calculate a probability distribution function to estimate a succeeding position of the electronic writing device on the physical surface using a Kalman filter and the time warp technique.

23. The electronic writing device of claim 4, wherein the processor is configured to generate an electronic copy and a physical copy of the writing data.

24. The electronic writing device of claim 23, wherein the processor is configured to verify the electronic copy based on the physical copy for review.

25. The electronic writing device of claim 1, wherein the electronic chip comprises a magnetometer, wherein the magnetometer is configured to compensate for rotation and angular orientation of the electronic writing device.

26. An electronic writing device comprising:
- a tip configured to enable writing on a physical surface;
- an electronic chip housed in a body of the electronic writing device and coupled to the tip, wherein the electronic chip comprises:
  - an accelerometer configured to record an acceleration data of the electronic writing device when writing on the physical surface;
  - a gyrometer configured to generate a rotation data corresponding to rotation of the electronic writing device;
- a memory device operatively coupled to the electronic chip and configured to store data received from the electronic chip; and
- a communication module operatively coupled to the memory device and configured to send the data stored in the memory to an external processing medium,
  - wherein the external processing medium comprises a processor which is configured to create a plurality of correction functions based on a signal representative of a speed of the electronic writing device to correct a shape of a text written by the electronic writing device, and
  - wherein the plurality of correction functions comprises an orthogonal correction function.

27. An electronic writing device comprising:
- a tip configured to enable writing on a physical surface;
- an electronic chip housed in a body of the electronic writing device and coupled to the tip, wherein the electronic chip comprises:
  - an accelerometer configured to record an acceleration data of the electronic writing device when writing on the physical surface;

a gyrometer configured to generate a rotation data corresponding to rotation of the electronic writing device;
a memory device operatively coupled to the electronic chip and configured to store data received from the electronic chip;
a processor operatively coupled to the memory device and configured to:
retrieve a stored data from the memory device;
generate a writing data corresponding to the acceleration data and the rotation data;
detect a contact of the electronic writing device with the physical surface based on a predefined frequency noise data detected from the acceleration data; and
calculate a position of the electronic writing device during contact of the electronic writing device —with the physical surface based on the acceleration data obtained from the accelerometer and the rotation data obtained from the gyrometer,
wherein the processor is configured to create a plurality of correction functions based on a signal representative of a speed of the electronic writing device to correct a shape of a text written by the electronic writing device, and
wherein the plurality of correction functions comprises an orthogonal correction function.

28. An electronic chip comprising:
an accelerometer configured to record an acceleration data of an electronic writing device when writing on a physical surface;
a gyrometer configured to generate a rotation data corresponding to rotation of the electronic writing device;
a memory device operatively coupled to the accelerometer and the gyrometer, wherein the memory device is configured to store data received from the accelerometer and the gyrometer;
a processor operatively coupled to the memory device, wherein the processor is configured to:
generate a writing data corresponding to the acceleration data and the rotation data;
detect a contact of the electronic writing device 10 with the physical surface based on a predefined frequency noise data detected from the acceleration data; and
calculate a position of the electronic writing device 10 during contact of the electronic writing device with the physical surface based on the acceleration data obtained from the accelerometer and the rotation data obtained from the gyrometer,
wherein the processor is configured to create a plurality of correction functions based on a signal representative of a speed of the electronic writing device to correct a shape of a text written by the electronic writing device, and
wherein the plurality of correction functions comprises an orthogonal correction function.

29. A method comprising:
enabling writing on a physical surface using an electronic writing device;
receiving an acceleration data from an accelerometer when writing on the physical surface using the electronic writing device;
receiving a rotation data corresponding to rotation of the electronic writing device;
generating a writing data corresponding to the acceleration data and the rotation data;
detecting a contact of the electronic writing device with the physical surface based on a predefined frequency noise data detected from the acceleration data; and
calculating a position of the electronic writing device during contact of the electronic writing device with the physical surface based on the acceleration data obtained from the accelerometer and the rotation data obtained from the gyrometer,.
wherein a plurality of correction functions are created based on a signal representative of a speed of the electronic writing device to correct a shape of a text written by the electronic writing device, and
wherein the plurality of correction functions comprises an orthogonal correction function.

30. The method of claim 29, wherein enabling writing on the physical surface using the electronic writing device comprises enabling writing on a paper using a pen, on a paper using a pencil, on a board using a chalk and, on a board, using a marker.

31. The method of claim 29, wherein detecting the contact of the electronic writing device —with the writing surface based on the predefined frequency noise data detected from the acceleration data comprises detecting the contact of the writing surface with the electronic writing device at a start and an end of the writing.

32. The method of claim 29, wherein calculating the position of the electronic writing device during contact of the writing device with the physical medium based on the acceleration data obtained from the accelerometer and the rotation data obtained from the gyrometer comprises calculating the position of the electronic writing device during contact of the electronic writing device with the physical surface based on a friction force between the electronic writing device and the physical surface.

33. The method of claim 29, wherein calculating the position of the electronic writing device during contact of the writing device with the physical medium based on the acceleration data obtained from the accelerometer and the rotation data obtained from the gyrometer comprises calculating the position of the electronic writing device during contact of the writing device with the physical medium based on the acceleration data obtained from the accelerometer and the rotation data obtained from the gyrometer when the speed of the electronic writing device is zero at a start and an end of the contact of the electronic writing device with the physical surface.

34. The method of claim 29, further comprising selecting an envelope of the predefined frequency noise data from the acceleration data and the rotation data to generate the signal representative of the speed of the electronic writing device.

35. The method of claim 29, further comprising computing a plurality of weights for the plurality of correction functions based on a first set of parameters, wherein the first set of parameters comprises a total distance travelled by the electronic writing device, the speed of the writing, a moment of displacement and an area enclosed by the text.

36. The method of claim 35, wherein computing the plurality of weights for the plurality of correction functions based on a first set of parameters, wherein computing the plurality of weights for the plurality of correction functions based on the first set of parameters comprises computing the plurality of weights for the plurality of correction functions based on a negative correlation between a curvature of the text and speed of the writing.

37. The method of claim 29, further comprising calculating a cost function based on the curvature of the text and the speed of the writing.

38. The method of claim 37, further comprising performing character matching based on a distance squared cost function and an absolute value of the distance.

39. The method of claim 29, further comprising performing character matching using a dictionary, wherein the dictionary comprises a probability distribution of a next character of the text.

40. The method of claim 37, further comprising performing a user authentication based on the cost function, wherein the cost function comprises a sum of the distance or a distance squared between a velocity and a reference velocity.

41. The method of claim 40, further comprising performing the user authentication based on the cost function, wherein the cost function comprises a sum of the distance or a distance squared between an acceleration and a reference acceleration.

42. The method of claim 40, further comprising performing the user authentication based on a time warp technique.

43. The method of claim 42, further comprising calculating a probability distribution function to estimate a succeeding position of the electronic writing device on the physical surface using a Kalman filter and the time warp technique.

44. The method of claim 29, further comprising extracting meta data associated with the writing data.

45. The method of claim 44, wherein extracting meta data associated with the writing data comprises extracting a date, a time, a plurality of pauses between writing, a size, a font, an extracted text and a Global Positioning System (GPS) location.

46. The method of claim 44, further comprising creating a plurality of documents based on the meta data.

47. The method of claim 44, further comprising creating a plurality of filled forms based on the writing data and the meta data.

* * * * *